United States Patent [19]

Hiyama et al.

[11] Patent Number: 4,855,995
[45] Date of Patent: Aug. 8, 1989

[54] METHOD AND SYSTEM FOR DATA TRANSMISSION

[75] Inventors: Kunio Hiyama, Fujisawa; Kenji Kawakita, Kawasaki; Osamu Takada, Yokohama, all of Japan

[73] Assignee: Hitachi, Ltd., Tokyo, Japan

[21] Appl. No.: 7,339

[22] Filed: Jan. 27, 1987

Related U.S. Application Data

[63] Continuation of Ser. No. 402,418, Jul. 28, 1982, abandoned.

[30] Foreign Application Priority Data

Jul. 31, 1981 [JP] Japan .................... 56-119064
May 24, 1982 [JP] Japan .................... 57-86636

[51] Int. Cl.$^4$ .................... H04J 3/00; H04J 3/16
[52] U.S. Cl. .................... 370/86; 370/89; 370/94
[58] Field of Search ............ 370/85, 86, 89, 94, 370/100, 106; 375/114, 116; 340/825.05

[56] References Cited

U.S. PATENT DOCUMENTS 4,154,983 5/1979 Pedersen .................... 370/89

*Primary Examiner*—Douglas W. Olms
*Assistant Examiner*—Wellington Chin
*Attorney, Agent, or Firm*—Antonelli, Terry, and Wands

[57] ABSTRACT

Herein disclosed is a data communication system in which a plurality of node equipments are linked to a common signal transmission line so that the data may be communicated between the respective node equipments. The data communication system is characterized: in that at least one of the node equipments includes means for generating and transmitting repeatedly for a predetermined period the channel which contains a data transmission bit and a validity bit for the former bit; and in that each of the node equipments linked to the common signal transmission line partly sends out the data through said channel and partly makes the validity indicating bit indicate an invalid state, when the speed of said data is so slower than the predetermined period of said channel that the data to be sent out for the predetermined period are out of time thereby to make it possible to effect the data transmission at an arbitrary speed shorter than said predetermined period.

Herein also disclosed is a data communication system in which a plurality of node equipments are jointed by a common transmission loop line and in which the information of multiple channels is repeatedly transmitted for a predetermined period to said transmission loop line so that the channel information may be sent and received between terminal equipments linked to said node equipments. The data communication system is characterized in that an identical pattern for synchronization is inserted into and transmitted by the plural head channels of each period so that the synchronization is effected at each of said node equipments by detecting the synchronizing pattern received by means of a detecting circuit.

12 Claims, 26 Drawing Sheets

| CHANNEL | INFORMATION |
|---|---|
| A0 | SOURCE NODE ADDRESS |
| A1 | SOURCE TERMINAL NUMBER |
| A2 | DESTINATION NODE ADDRESS |
| A3 | DESTINATION TERMINAL ADDRESS |
| A4 | LINK CONTROL CODE |
| A5 | USING CHANNEL NUMBER |
| A6 | PARAMETER |
| A7 | PARAMETER |
| A8 | PARAMETER |
| A9 | PARAMETER |
| A10 | PARAMETER |
| A11 | PARAMETER |
| A12 | PARAMETER |
| A13 | PARAMETER |
| A14 | CHECK CODE |
| A15 | STATUS |

| CHANNEL | INFORMATION |
|---|---|
| D0 | SOURCE NODE ADDRESS |
| D1 | SOURCE TERMINAL NUMBER |
| D2 | DESTINATION NODE ADDRESS |
| D3 | DESTINATION TERMINAL NUMBER |
| D4 | DATA |
| D5 | DATA |
| | |
| $D_{l-1}$ | CHECK CODE |
| $D_l$ | STATUS |

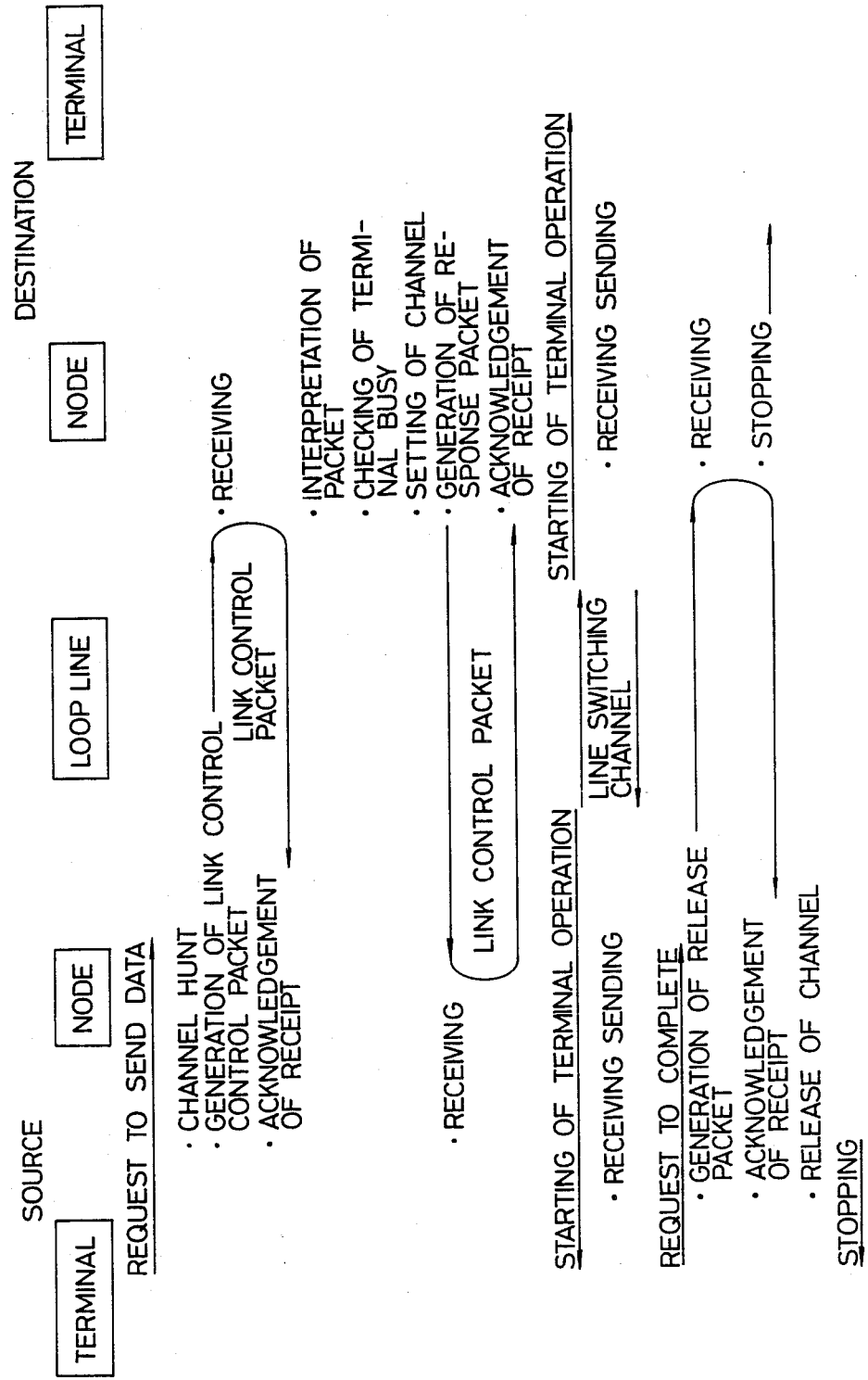

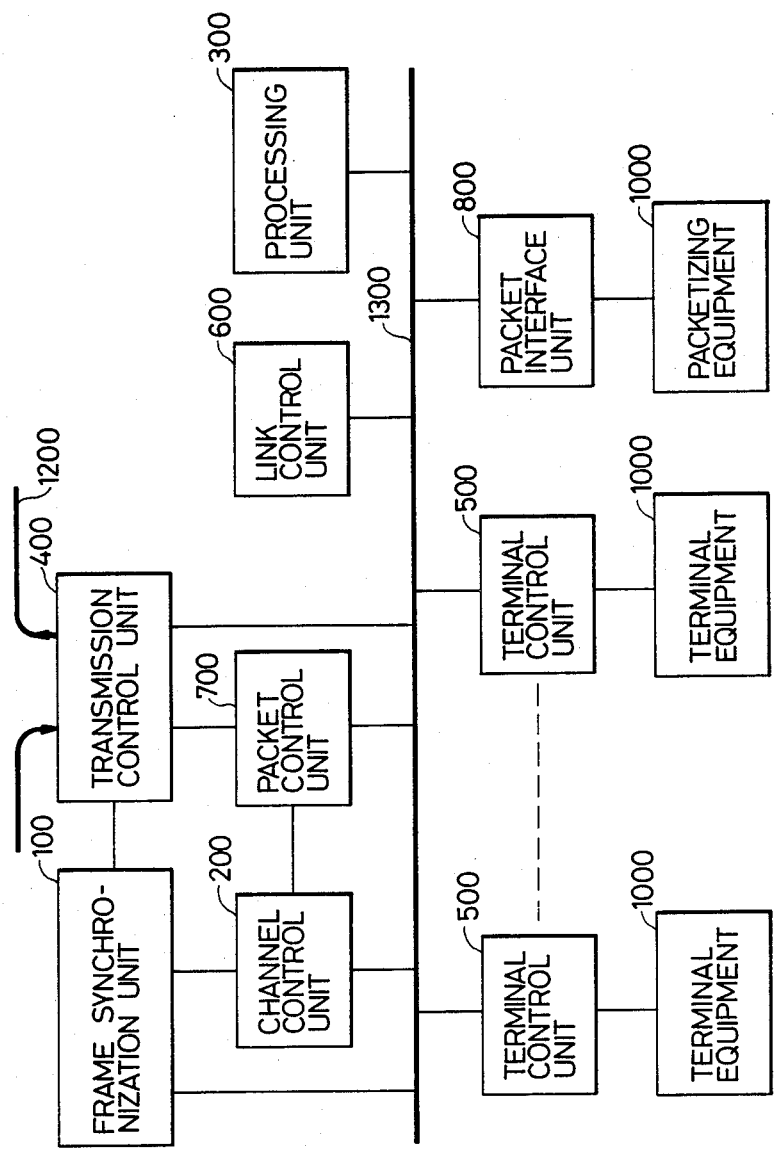

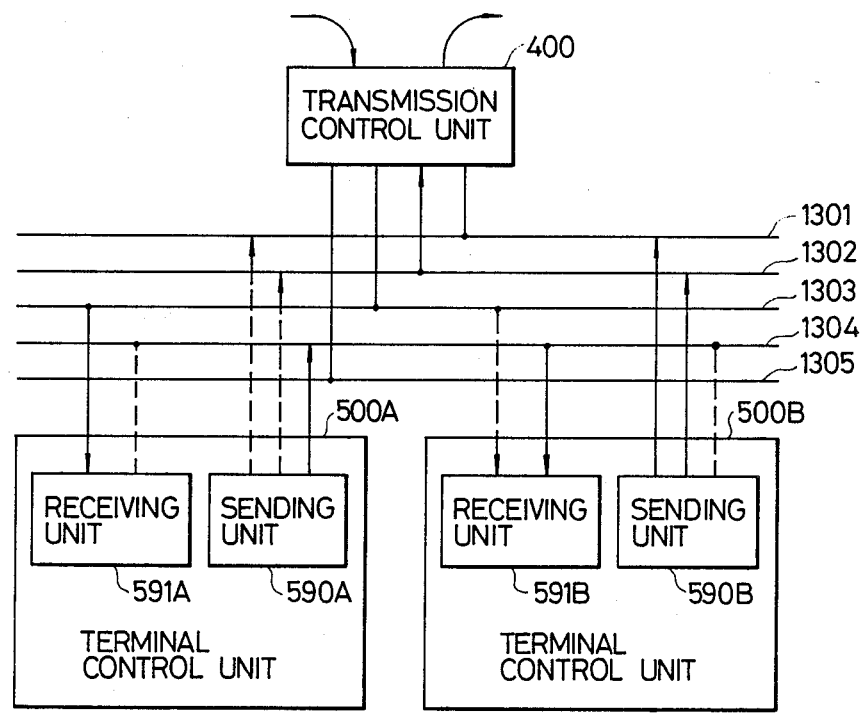

(a) DATA TERMINAL SENDING DATA (b) SYNC (c) TRANSMISSION DATA

METHOD AND SYSTEM FOR DATA TRANSMISSION

This is a continuation of application Ser. No. 402,418, filed 7/28/82, now abandoned.

BACKGROUND OF THE INVENTION

1. Field of the Invention

The present invention relates to a data communication system and, more particularly, to a system having its multiplicity of terminal units connected to a common transmission line so that data may be sent and received in a time division manner between those terminal units.

2. Description of the Prior Art

In recent years, there is being highlighted an office automation system (which will be simply referred to as an "OA") which is intended to improve the efficiency of office operations and tasks. The main direction of the OA of the prior art has been in the individual and typical works executed by the batch processing system. From now on, however, it is desired to automate the office operations on a higher grade, involving so-called "data processing", such as an electronic file, electronic mail or document edition.

On the other hand the possibility of applying high-speed and low-price digital transmission to a familiar network is enhanced with the fast development in the optical communication technique which is based upon the use of optical fibers or light-emitting diodes.

In view of the technical background thus far described, attempts are being made to realize an integrated network system in which a facsimile, a telephone, a word processor, a personal computer or a variety of data terminal units are connected to a common signal transmission line so that data communication can be freely effected between the terminals.

In order to realize such a network, however, the following problems have to be solved.

That is to say, it is necessary to solve the problem which is caused by the fact that many kinds of terminal units are connected to a common transmission line so that the speeds of the data to be handled by the respective terminal units are extremely different. Of the existing terminal units, there are many kinds of different terminals which handle data from a super-low speed of about 50 bps to a higher speed than 1 Mbps. In recent developments in telephone switching, there has been developed a time-division switching device which is made operative to convert an analog signal within a voice range of 0.3 to 3.4 KHz into digital information of 8 KHz (or having a period of 125 us) and of 8 bits (which may be 7 bits) thereby to effect the switching operations at a digital information level. In this case, it is necessary to cope with the data speed of 64 Kbps (i.e., 8 bits × 8 KHz).

The realization of a data communication system which is effective for coping with many different data speeds is a remarkably important subject of the integrated network of that kind.

A second problem is that, of the terminal units existing at present, there are units for data communication by means of a line switching system and units for data communication by means of a packet switching system so that their respective switching networks exist in an independent manner.

It is, therefore, necessary to connect many kinds of terminal equipments which are so constructed as to effect data communication by those different types of switching systems, with a common transmission line so that the data communications may be performed by either of the two switching systems with a view to ensuring effective communications between the terminals.

SUMMARY OF THE INVENTION

It is, therefore, an object of the present invention to provide a novel data communication system which can cope with the aforementioned problems.

In order to achieve that object, according to a main feature of the present invention, a frame, which is composed of a plurality of channels and which has its plural head channels constructed of a predetermined identical pattern, is transmitted to a transmission line for coupling node units so that synchronizations may be effected at the node units, respectively, by detecting that a predetermined number of the predetermined patterns are continuously received.

BRIEF DESCRIPTION OF THE DRAWINGS

FIGS. 3A and 3B are constructional views showing one embodiment of a node equipment of the system of the present invention;

FIGS. 8A, 8B, 8C and 8D are constructional views showing one embodiment of a terminal control unit of the system of the present invention;

FIG. 13 is an explanatory view showing a bit assigning example of the channels of the 10- and 8-bit systems;

FIG. 14 is a constructional view showing an embodiment of the transmission control unit; and FIG. 15 is a constructional view showing one embodiment of a terminal control unit.

DESCRIPTION OF THE PREFERRED EMBODIMENTS

First of all, the construction of the overall system of the present invention will be described with reference to FIG. 1.

Figure 1:
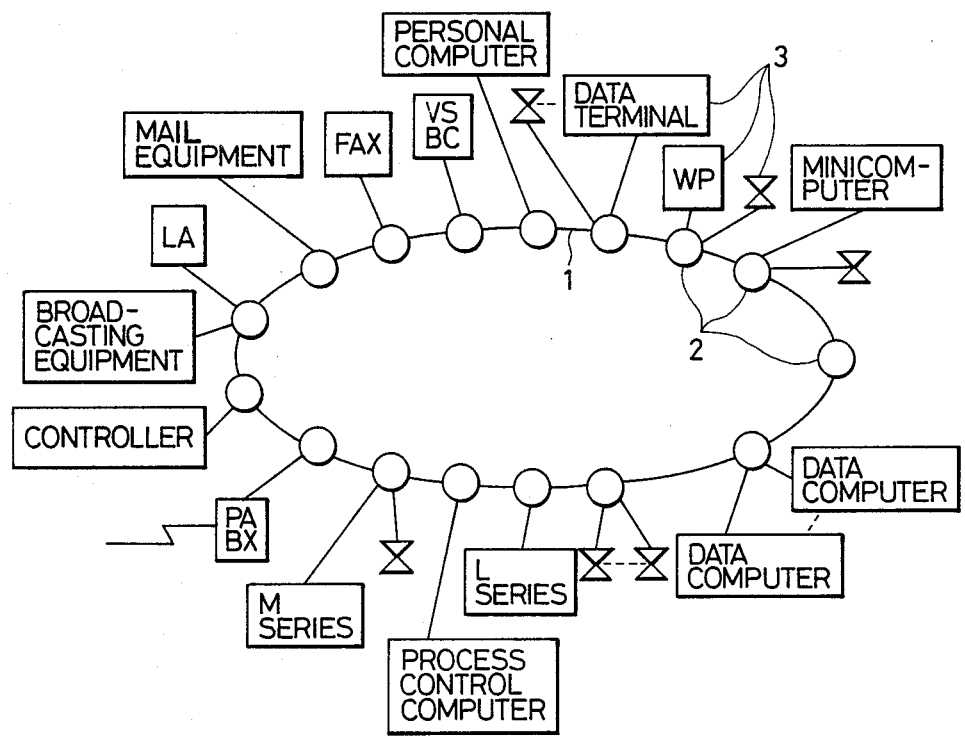
FIG. 1 is a schematic view for explaining the whole system construction of the system of the present invention.

In FIG. 1, reference numeral 1 indicates a loop-shaped common transmission line which uses optical fibers, for example. Indicated at numeral 2 are node units which are connected to that transmission line, as will be described in detail later. For one loop, thirty-two to sixty-four node units may be connected, and at least one of them has a function to generate a frame which is composed of a synchronization signal region and an information channel region. Indicated at numeral 3 are terminal units, which may comprise a facsimile, a word processor, a personal computer, a mini-computer, a telephone, a variety of data terminal units or the like. For example, eight to thirty-two terminal units may be connected for each of the node units. In the aforementioned example, therefore, two hundred and fifty-six to two thousand and forty-eight terminals may be connected for one transmission loop line. Of course, the number of those units is no more than an example, and it is quite natural that the system of the present invention should not be limited thereto.

Next, the frame construction of a time-division multiplex communication system of the present invention will be described in the following.

In the system of the present invention, information of one bit row is transmitted on the aforementioned loop-shaped transmission line 1. A group composed of a predetermined number of bits is referred to here as a "channel", and a group composed of a predetermined number of channels is called a "frame". The frame thus defined is generated at a predetermined repetition period if the transmission speed is constant.

Figure 2A:
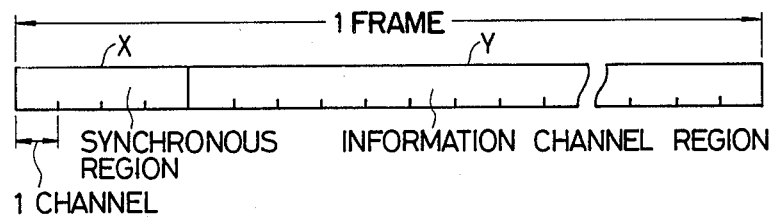
FIGS. 2A, 2B, 2C, 2D, 2E, 2F, 2G, 2H, 2J and 2L are schematic views for explaining the frame construction of the system of the present invention.

The frame in the system of the present invention is constructed, as shown in FIG. 2A, of a synchronous region X and an information channel region Y. As the synchronous region X, for example, four channels are assigned, whereas the remaining channels are used as the information channel region. In the present embodiment, one channel is composed of ten bits. The repetition period of the frame is selected, in this example, to be at 125 μs (i.e., 8 KHz). Therefore, the channel number of one frame is 125, if the data speed is 10 Mbps, and is 400 if the data speed is 32 Mbps.

A bit pattern of ten bits for synchronization is introduced into each channel of the synchronous region. That bit pattern is desired to have a reduced frequency of appearance in the information channel region Y.

Figure 2B:
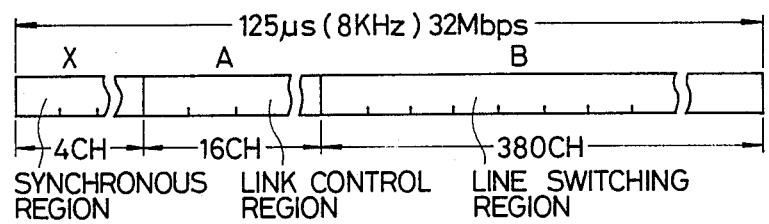
Figure 2C:
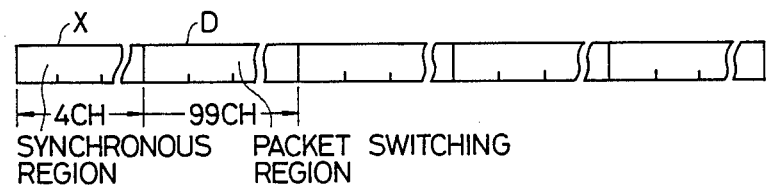
Figure 2D:
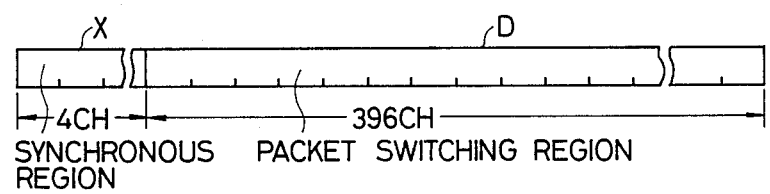
Figure 2E:
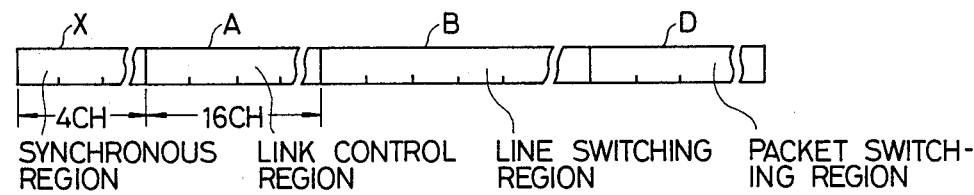

This information channel region Y has different frame constructions for a line switching function and a packet switching function. FIG. 2B shows the frame construction for the line switching function; FIGS. 2C and 2D show the frame constructions for the packet switching function; and FIG. 2E shows the frame construction in case the two functions coexist. The respective frame constructions will be described in detail in the following.

Frame Construction for Line Switching Function

As is apparent from FIG. 2B, the frame for the line switching function is constructed of the synchronous region X, a link control region A and a line switching region B.

The head of the frame is the synchronous region X, which is used for transmitting a fixed synchronous letter (which is a bit pattern having ten bits) for acknowledging the head of the frame, and is constructed of a plurality of channels. The subsequent region is constructed of the two regions, i.e., the link control region A and the line switching region B, either of which may go ahead if it is continuous. On the other hand, the frame may contain regions other than the aforementioned three regions as a whole.

The link control region A is used to packet and transmit the so-called "link control information" such as the addresses of the destination node and terminal units, to which data is to be sent, the addresees of the node and terminal units at the source, or the channel numbers in the line switching region B to be used for sending and receiving data.

Figures 2F, 2G:
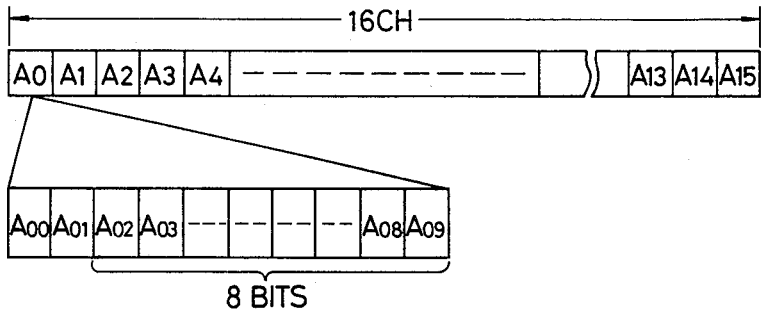

That link control region A is constructed of sixteen channels $A_0$ to $A_{15}$, as shown as an example in FIG. 2F. Each channel is formed of ten bits, the first one $A_{00}$ of which is used for the busy indicating of the link control region A. More specifically, if the repetition period of the frame is 125 μs (8 KHz), different pieces of information in the maximum 8 K pieces/sec can be transmitted as the link control information. However, the busy state of that region is indicated by setting the $A_{00}$ bit at "1", in case that link control region A is used, and at "0" in case that region A is not used. Incidentally, that link control region A is used only when the channel, in which the data is to be transmitted between the terminals, or in case the set state is released, and only the line switching channel is used for a period in which the data sending and receiving operations are being really conducted.

A second bit $A_{01}$ of the channel of the link control region A is preliminarily provided, and its explanation is omitted because it has no direct relationship with the present invention.

The eight bits of each of the channels $A_{02}$ to $A_{09}$ indicate the data information. FIG. 2G shows an example of the relationship between each of the channels $A_0$ to $A_{15}$ of the link control region A and the information to be transmitted through the corresponding channel.

The channel $A_0$ is used to transmit the address information of the node unit for the data source. The channel $A_1$ is used to assign one of the terminals connected to that node unit. The channel $A_2$ is used to transmit the information indicating the address of the destination node unit which is to send data. The channel $A_3$ is used to transmit the information indicating the terminal address of the data destination, which is connected with that node equipment. The channel $A_4$ is used to transmit the link control code which indicates the discrimination between the request to send data and the request to complete. The channel $A_5$ *is used to transmit the information that predetermined channel number in the line switching region B, which is used to effect the data communication. The channels $A_6$ to $A_{13}$ are* used to transmit a variety of parameters, but their explanations are omitted because they have no direct relationship with the present invention. In case plural channels in the line switching region B are to be used to accomplish the communiciation, those channels $A_6$ to $A_{13}$ can also be used to indicate the used channel number. The channel $A_{14}$ is used to transmit the check code. For example, the result, which is obtained by subjecting the data of the channels $A_6$ to $A_{13}$ to predetermined operational processings, is transmitted as a check code, and the identical operational processings are executed at the reception side for the identical data so that the correctness of the sent data is checked. The channel $A_{15}$ is used to transmit the status information. For example, the destination node unit of the data carries predetermined information on that channel $A_{15}$ and sends it back to the source. Thus, the source node unit can acknowledge the transmission of the data.

On the other hand, the line switching region B is used to effect the information switching operation to be aimed at between the plural terminal units through the channel which is assigned by the aforementoned link control region A.

Figure 2H:
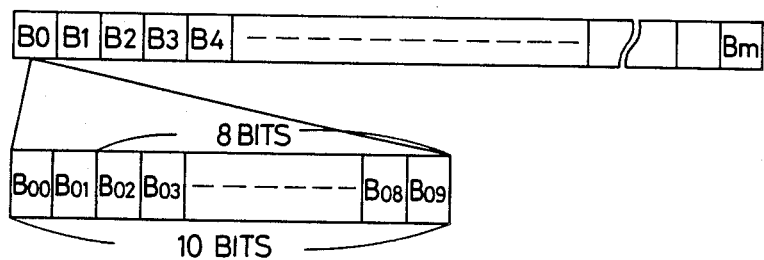

That line switching region B is constructed of an arbitrary number of channels $B_0$, $B_1$, $B_2$, ..., and $B_m$. As shown in FIG. 2H, each channel is constructed of ten bits, of which the lower eight bits $B_{02}$ to $B_{09}$ are assigned for the data transmission. The head bit $B_{00}$ is used as a busy indicating bit for indicating whether that channel is busy or not. A second bit $B_{01}$ is used to indicate whether the eight-bit data of that chennel is valid or invalid. The adjustment of the data speed is made possible by the valid/invalid bit $B_{01}$ of that information, and the reason therefor will be briefly described in the following.

In the system of the present invention, as has been described, since the period of one frame is selected to be 125 $\mu$s (8 KHz), for example, the quantity of the data, which can be transmitted through one channel for one second, is 8 bits$\times$8K=64K bits. In the present invention, that channel is used as a unit, and one channel is assigned to one terminal, in case a request to send is made from the terminal even if this terminal handles ultra-low speed data. Therefore, in case the terminal has an ultra-low data speed such as 50 bps, the data to be transmitted is generated at a rate of once for the 64K/50 frame even if one channel is assigned to that terminal. In other words, even if the frame is repeatedly generated 8K times for one second, the use of the channel of that frame is made sufficient once for 1,000 frames so that the ultra-low speed data can be transmitted. Therefore, if one channel is noted, the frame having that channel carrying the data and the frame having no data are repeatedly generated. In the present invention, in case the data is carried on the assigned channel, the $B_{01}$ bit is set with the valid indication, e.g., "1". In the case of no data, the $B_{01}$ bit is set with the invalid indication, e.g., "0". As a result, the state "1" of the $B_{01}$ bit expresses the speed of the data. In other words, each of the node units is enabled by making use of the $B_{01}$ bit to freely adjust the data having different speeds and to send and receive it.

On the other hand, in case data at a higher speed than 64 Kbps is to be transmitted, this transmission can be easily coped with by the assignment of plural channels. For example, sixteen channels may be assigned to the terminal which handles the high speed data of 1 Mbps.

Now, in case voice PCM data is to be sent by telephone, information is transmitted for each channel of 125 $\mu$s thereby to make the valid/invalid bits of the information unnecessary.

Figure 2J:
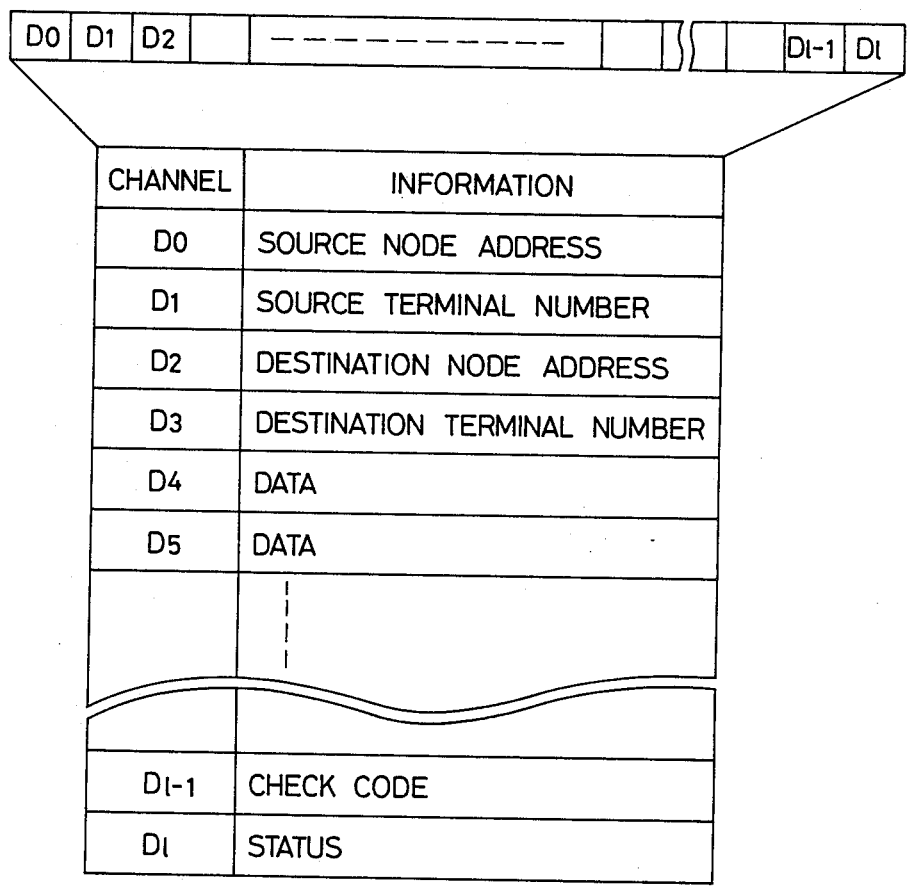
Figure 2K:
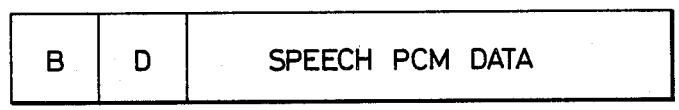
FIG. 2I is an explanatory view for explaining the operations of the system of the present invention when in a line switching function.

In view of this fact, as shown in FIG. 2K, the data bits are used in place of the information valid/invalid bits so that each of the channels can be constructed of eight bits of the voice PCM data, the busy indicating bits B and data bits D.

On the other hand, a variety of control signals, e.g., the signals of the request to send are used for transmission control of the data information, and link control packets can be used for sending those control signals. In case those link control packets are used, the control information cannot be sent at a high speed.

Figure 2L:
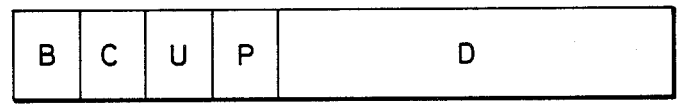

As shown in FIG. 2L, therefore, each of the channels may be constructed of control information bits C for transmitting the control information in addition to the busy indicating bits B, the valid/invalid indicating bits V and the data information bits (e.g., six bits) D.

Then, the control information can be transmitted at a high speed so that the aforementioned construction is effective in case a high-speed response is required.

Incidentally, each channel is constructed, as shown in FIG. 2L, of parity bits P for checking the data information in addition to the aforementioned bits.

Next, the data communicating procedures according to the line switching system will be described in the following with reference to FIG. 2I.

Upon a request to send from a terminal, the node equipment prepares the destination address from the logic address (e.g., a telephone number) of the destination terminal. The address of each node unit is determined in advance by the well known method in which it is fixedly assigned.

Next, of the channels $B_0$ to $B_m$ of the line switching region B, the channel having its busy indicating bits (e.g., $B_{00}$, $B_{10}$, $B_{20}$ and so on) indicating the unbusy state (e.g., "0") is located and is made to indicate the busy state (e.g., "1"). After that, a link control packet is prepared on the basis of the link control format shown in FIG. 2G. In this case, the region corresponding to the channel $A_4$ is stored with the code indicating the request for the link, and the region corresponding to the channel $A_5$ is stored with the data indicating the hunted channel number.

When the link control packet has been prepared, a link control packet region A indicating the unbusy state is located to transmit said packet (which will be referred to as a "first packet"). The busy state of the aforementioned region A can be recognized in view of the busy indicating bit $A_{00}$ of the head channel $A_0$ of the link control packet region A, as has been described hereinbefore.

The aforementioned link control packet is received by the receiving node to interpret the content of the packet information. First of all, when not in use, the using channel number (i.e., the data of the channel $A_5$) given is set in the terminal control unit of the aforementioned node unit. By setting that using channel number, the data which is subsequently sent through that channel is received by the terminal. After that, the response packet information implying that the channel setting process has been completed at the destination node unit is prepared so that the packet (which will be referred to as a "second packet") is sent to the source node unit.

This source node unit waits for the reception of the second packet of the response information after the acknowledgement of receipt of the first packet. After the receipt of the second packet, a predetermined timing is taken to send the starting instruction to the source terminal.

On the other hand, the destination node unit sends the starting instruction to the terminal as soon as it confirms the receipt of the second packet indicating the response information. By this time, the terminal control units of the source and destination node units have already been set with an equal using channel number, and the information switching operations between both the terminals are continuously conducted at the periodic interval of the frame by way of the designated channel of the line switching region B.

When data to be sent is not generated yet in the terminal at the timing in which a certain frame is generated, the fact that the data of the frame is invalid is transmitted to the destination node unit by setting the validity indicating bit (e.g., $B_{01}$) of the channel with "0", for example. The automatic adjustment of the data can be automatically performed by making use of the validity indicating bit, as has been described hereinbefore.

When a request to complete the data transmission is generated by the source terminal, the packet information indicating the request to complete is prepared in the format shown in FIG. 2G. That packet information is transmitted to the destination node unit. Both of the node units send the stop indicating signal to the terminals and release the channels being used. In other words, the source node unit sets the head bit of the channel being used with "0" to restore the unbusy state, whereas the destination node unit releases the set channel.

The controls thus far described are executed on the basis of the instruction from the processing equipment in the node equipment, as will be described hereinafter.

Frame Construction For Packet Switching Function

The frame for the packet switching function is constructed, as shown in FIGS. 2C and 2D, of the synchronous region X and the packet switching region D.

The synchronous region X is used to recognize the leading end of the frame similarly to the case of the frame for the line switching function.

The packet switching region D may either have all of its information channel regions made into a single packet switching region, as shown in FIG. 2D, or it may be divided into a plurality of packet switching regions for use, as shown in FIG. 2C.

Each of the packet regions D is composed, as shown in FIG. 2J, of a plurality of channels $D_0, D_1, ---$, and $D_\lambda$, to which the information to be respectively sent thereby is assigned in advance, as shown in the same Figure. Of course, FIG. 2J shows no more than one example, and the method of assigning the packet format and the addresses can be performed by another method.

In the present embodiment, the address information at the source side, i.e., the side from which the packet is sent is transmitted through the two head channels $D_0$ and $D_1$, and the address information at the destination side, i.e., the side by which the packet is received is transmitted through the subsequent two channels $D_2$ and $D_3$. Moreover, the addresses of the node units are assigned to the channels $D_0$ and $D_2$, whereas the addresses of the terminal units are assigned to the channels $D_1$ and $D_3$.

The continuous channels $D_4$ to $D_{l-2}$ subsequent to the channel $D_4$ are assigned for the data transmission. The channel $D_{l-1}$ preceding the last channel is assigned for checking the codes of information of the channels $D_0$ to $D_{l-2}$, and the final bit $Dl$ is assigned to indicate status.

Incidentally, each of the channels is constructed of ten bits similarly to the case of FIG. 2F, and the highest bit of the head channel $D_0$ is exclusively used for the busy indication of the packet switching region whereas the lower eight bits of each channel indicate the content of the information.

Next, the data communication operations by the packet switching system will be described in the following.

In accordance with the request to send data from the source terminal, the source node unit waits until an idle packet region is received and sends the packet information to the transmission line while that region is in the state for the busy indication.

Each node unit checks the destination address in the packet information and transmits it as it is to another node unit when the destination is not coincident with its own node address. When the destination address of the channel $D_0$ becomes coincident with the node address, the node unit starts its receiving operations.

The receiving node unit transfers the packet information to the receiving terminal, which is connected therewith, and carries the status information indicating the receipt on the final channel $Dl$ of the packet information so that the status information is consecutively transmitted together with other information to the subsequent node unit.

When the packet information circulates through the loop type transmission line and returns to the sending node unit, this sending node unit takes the circulated packet information therein because the course address of the channel $D_0$ is coincident with the node address of the node unit. At the same time, the busy indicating bit $D_{00}$ of that packet region is made to indicate the idle state, thus completing the transmission. The sending node unit is enabled to examine the transmission to see if it is normal by checking the status of the packet information taken in after the circulation.

The frame construction for the line switching function and for the packet switching function according to the system of the present invention have been described hereinbefore together with its data communication system. In the present invention, however, both the switching systems can be suitably interchanged for data communication. On the other hand, both the line and packet switching regions can be simultaneously formed in one frame so that the data communication can be conducted in the form in which both the switching systems coexist.

FIG. 2E shows the frame construction in case the line switching function and the packet switching function are to be simultaneously realized. The respective formats of the synchronous region X, the link control region A, the line switching region B and the packet switching region D of that frame are similar to those of FIGS. 2B to 2D, and their explanations are omitted. In FIG. 2E, incidentally, the order of the respective regions A, B and D may be arbitrary, and the packet switching region D may be divided into plural portions.

FIG. 3A shows one example of the whole construction of a typical node unit for realizing the data communication system according to the present invention. Numeral 100 indicates a frame synchronization unit; numeral 200 a channel control unit; numeral 300 a processing unit; numeral 400 a transmission control unit; numeral 500 a terminal control unit; numeral 600 a link control unit; numeral 700 a packet control unit; numeral 800 a packet interface unit; numeral 1000 a terminal unit, numeral 1100 a packetizing unit; numeral 1200 an optical transmission loop line; and numeral 1300 a terminal bus.

In the constructions thus described, in the frame synchronization unit 100, the head synchronization signal of the frame is discriminated from the received signal sent from the transmission loop line 1200, and a clock timing signal indicating the head of the frame and the channels in the frame are prepared and sent out to another portion.

The channel control unit 200 functions to discriminate the channel address in a frame, to instruct the line switching region in a frame, to instruct the line switching region in a frame and to control the operation of and indicate the state of a node.

The processing unit 300 is a portion to execute the stored program control using a microcomputer or a memory and conducts the program control such as the link control processing or the initial setting processing.

The transmission control unit 400 receives an input signal from the transmission loop line 1200 and prepares a signal to be sent to the transmission loop line 1200 after it has exchanged signals to be sent and received with a predetermined terminal 1000 or the like.

The terminal control unit 500 controls the sending and receiving operations with the corresponding terminal 1000 and the transmission of the data to be sent and received with the transmission control unit 400. For these operations, the channel address in a frame to be transmitted is stored.

The link control unit 600 executes the link control of the line switching operations and the sending and receiving processings of a packet. On the other hand, the packet control unit 700 has such fundamental functions as are necessary for the packet sending and receiving operations for effecting the detection of coincidence of addresses, the location of an idle channel and the preparation of sending and receiving timings.

The packet inferface unit 800 executes the controls of the control signal and the data to be sent and received with the packetizing unit 1100, when it has the packet switching region, and the storage of the packet region.

The terminal bus 1300 has functions to link those units 100 to 800 and to control their mutual sending and receiving operations.

With the constructions thus far described, if a signal to be received comes from the transmission loop line 1200, the reception demodulation is effected in the transmission control unit 400. In the frame synchronization unit 100, the head synchronization signal of the frame is discriminated from that received signal, and a clock timing necessary for receiving the frame and the channels in the frame is prepared and sent out to another portion.

In the channel control unit 200, a channel number signal is prepared in accordance with the timing from the frame synchronization unit 100 and is sent out to the terminal bus 1300, and a judgement whether it is in the line switching region or not is made from that channel number signal and is likewise sent to the terminal bus 1300. In the link control unit 600, whether the received channel is the head or tail of the link control packet region is judged from the channel number signal coming from the channel control unit 200 and is sent to the packet control unit 100.

Now, if a request to send data is given from a certain terminal 1000, it is detected by the processing unit 300 so that a request to hunt is sent to the terminal control unit 500. In this terminal control unit 500, the channel for the idle indication in the line switching region is located from both the busy bit of each channel, which has been taken from the transmission control unit 400, and the signal which indicates that it is within the line switching region from the channel control unit 200. If that idle indicating channel is found, the channel number signal at that time is taken and stored in the terminal control unit 500. At the same time, a signal is sent to the transmission control unit 400, and the busy bit in the corresponding channel is made to indicate the busy state and is fed out to the transmission loop line 1200.

In the processing equipment 300, the destination address is prepared by either the information received from the terminal 1000 or a predetermined fixed address, and it is read out for preparation together with its own address and the idle channel number taken out of the terminal control unit 500. The joint reqirement code or the like is edited on the basis of the link control packet format to prepare a link control packet, which is sent to the link control unit 600. At the same time, when a request to send data is sent from the processing unit 300 to the link control unit 600, the packet control unit 700 sends a signal to the transmission control unit 400, if the busy indicating bit of the head channel of the joint control packet region is found to be idle, so that it makes the busy bit of the head channel indicate the busy state and sends it to the transmission loop passage 1200. At the same time, a signal is sent to the link control unit 600, and the link control packet having already been set is sent to the transmission control unit 400 and is carried as packet sending information on the transmission loop line 1200.

The link control packet thus sent out to the transmission loop line 1200 is received by each node equipment. That operation sends the data of said region from the transmission control unit 400 to the packet control unit 700, in which the coincidence between the destination address and its own address is checked. If the coincidence is detected, the link control unit 600 is started so that the link control packet data received is taken in the link control unit 600 and is further read out by the processing unit 300.

In this processing unit 300, the content of the joint control packet read out is interpreted to acknowledge whether the terminal 1000 requested to be linked is in use or not. Unless it is not in use, the link control packet containing response information when the source node unit is used for the destination address is prepared and is sent together with the request for the data sending operation to the link control unit 600. After that, an idle joint control packet region is located in a manner similar to the aforementioned source node unit thereby to make the busy indicating bit indicate the busy state, and a start instruction is generated in the joint control terminal 1000. On the other hand, if it is indicated by the destination node unit that the information sent has circulated once through the transmission loop line 1200, the busy bit of the head channel of the joint control packet region is made to indicate the idle state similar to the aforementioned one, and the start instruction is sent to the terminal 1000.

Based on the start instruction sent from the processing unit 300, the source node unit sends data from the terminal 1000 to the terminal control unit 500.

In the terminal control unit 500, it is detected whether the set channel number is coincident with the channel number signal from the channel control unit 200. If the coincidence is detected, the data to be sent from the terminal 1000 is sent to the transmission control unit 400 so that the data to be sent is introduced into a corresponding channel and sent out to the transmission loop line 1200.

In the destination node unit, on the other hand, the data sent thereto is received by the transmission control unit 400 and sent to the terminal control unit 500. In this terminal control unit 500, the set channel number introduces the packet from the channel control unit 200 into that region and sends it out to the packet transmission line 1200. In the processing equipment 300, moreover, the idle channel number sent thereto is set at the terminal control unit 500 of the terminal 1000.

In the source node unit, on the other hand, when the packet returns after it has circulated once through the transmission loop line 1200, it is judged in the packet control unit 700 that the source address in the data taken by the transmission control unit 400 is coincident with its own address, and a signal is sent to the transmission control unit 400 to make the busy bit of the head channel of the link control packet region indicate the idle state.

On the other hand, if the link control packet sent from the destination node unit and indicating the response is received by the source node unit, it is detected in the packet control unit 700 that the destination address is coincident with its address. Similar to the aforementioned operation, the link control packet is taken through the link control unit 600 into the processing unit 300.

In this processing unit 300, the response information is acknowledged to judge whether it is coincident with the terminal channel number signal. If the coincidence is detected, the received data is taken in and sent to the terminal 1000. By the use of the same channel, moreover, the data can be sent similarly from the source node unit to the destination node unit.

Incidentally, the sending operation can be effected by the use of a different channel from the destination node unit to the source node unit.

Next, in the source node unit, if a request to complete the sending operation is given from the terminal 1000 to the processing unit 300, this processing unit 300 prepares the link control packet for instructing the interruption and feeds it to the destination node unit in a manner similar to the aforementioned operation thereby to instruct terminal 1000 to stop.

At the same time, in the source node unit, a request to release the channel is sent from the processing unit 300 to the terminal control unit 500. When the channel number signal becomes coincident with the number of the channel occupied, a signal is sent to the transmission control unit 400, and the busy indicating bit of that channel is made idle to effect the channel release.

In the terminal control unit 500, moreover, when the set channel number becomes coincident with the received channel number signal, the data indicating the invalidity of the validity indicating bit is sent, and in case there is no data coming from the terminal yet, it is necessary to transmit the invalidity of the data to the destination so that any processing speed of the terminal 1000 can be coped with.

On the other hand, the transmission control unit 400 has a functon, by which th data of the first to fourteenth channels of the link control packet sent from the link control unit 600 are subjected to predetermined calculations to prepare a check code so that this code is inserted for transmission into the fifteenth channel of the packet, and by which the data of the first to fifteenth channels of the link control packet received are subjected to predetermined calculations to check for error in the received data so that the calculated result is inserted for transmission as the status information into the sixteenth channel.

In case the packet switching operation is to be performed, on the other hand, the head channel of the packet switching region is detected in the packet interface unit 800 of the source node unit and is sent to the packet control unit 700. In this packet control unit 700, if the busy indicating bit from the transmission control unit 400 is found to be an idle channel indication, a signal is sent to the transmission control unit 400 so that the busy bit of the head channel is made to indicate the busy state. At the same time, the packet information, which has been prepared by the packetizing unit 1100 and set in the packet interface unit 800, is sent out of the transmission control unit 400 to the transmission loop line 1200. In the destination node unit, it is detected that the destination address of the packet data sent from the transmission control unit 400 is its own address, and the packet interface unit 1100 is informed of that result. In that interface unit 1100, the packet data sent is received and sent to the processing unit 300. If the completion channel of the packet switching region is detected at the packet interface unit 800, the completing operation is conducted.

If the packet data sent from each node unit returns to the node unit after it has circulated through the transmission loop line 1200, the packet control unit 700 receives the packet data likewise from the transmission control unit and checks to see if the sent address is coincident with its own address. In the case of a coincidence, a signal is sent to the transmission control unit 400 so that the head busy indicating bit of the corresponding packet is made to indicate the idle state thereby to release the packet region.

Figure 3B:
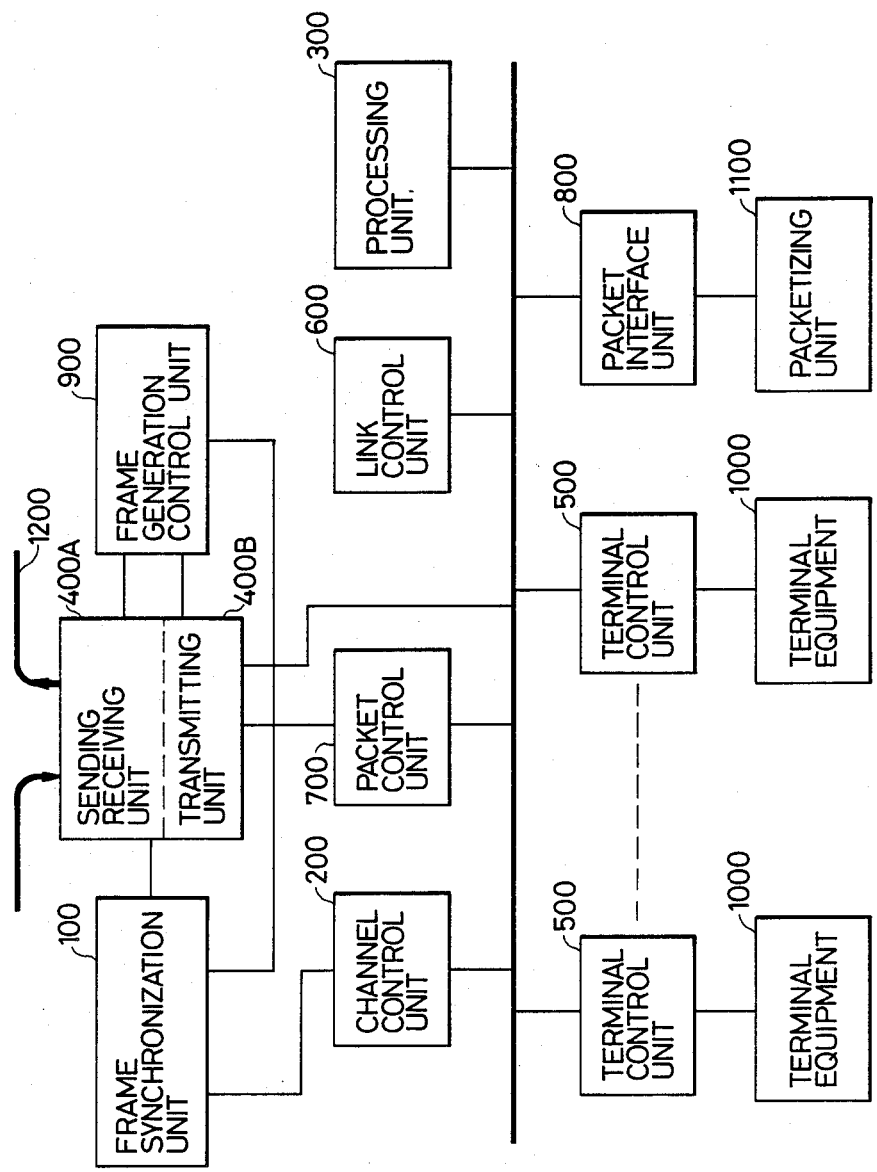

FIG. 3B shows one example of the construction of a node unit for realizing the data communication system according to the present invention, i.e., a node unit having a frame generating function. The node unit shown in FIG. 3B is different from that shown in FIG. 3A in that the transmission control unit 400 is divided into a sending/receiving unit 400A and a transmission unit 400B and in that a frame generation control unit 900 is connected between those units.

That node unit has both the function of the aforementioned usual node unit and a function to generate a frame of a predetermined period for the circulation through the transmission loop line 1200.

In the frame generation control unit 900, the frame information corresponding to that contained in one frame which has circulated through the loop is stored in a memory of the frame generation control unit 900 via the sending/receiving unit 400A of the transmission control unit 400. On the other hand, the frame generation control unit generates a sending clock, prepares a pattern of the synchronous region at the head based on said clock, and then reads out the above-mentioned memory sequentially to form a frame. The above information is sent to the transmission unit 400B of the transmission control unit. By following similar procedures, the information for the next node unit is sent via the sending/receiving unit 400A of the transmission control unit 400.

The frame generation control unit 900 also has a function of monitoring anomalies. That is, when the unit detects continuous occurrences above a predescribed frequency of the fact that all the busy indicating bits of each channel indicate the busy state in each of the line switching region and the packet switching region, the busy indicating bits of each channel are forced to indicate the idle state by this unit.

The other operations are the same as those of the case of FIG. 3A, and their explanations are omitted.

The specific examples of the constructions of the respective portions of FIG. 3A will be described in detail in the following.

(1) Frame Synchronization Unit 100

Figure 4:
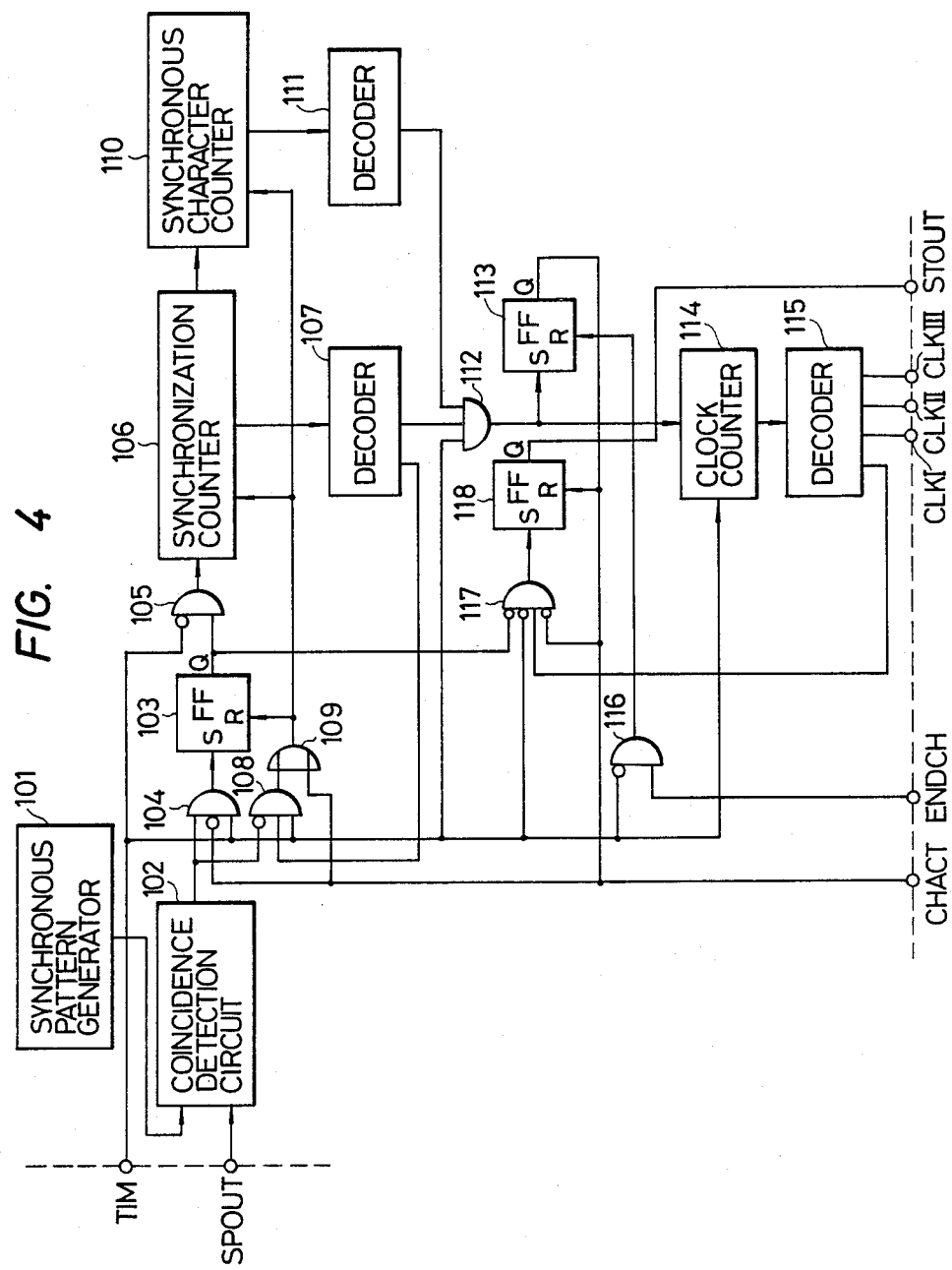
FIG. 4 is a constructional view showing one embodiment of a frame synchronization unit of the system of the present invention.

FIG. 4 shows one example of the specific construction of the frame synchronization unit 100.

In FIG. 4, signals TIM and SROUT are signals which are generated by a receiver and a shift register, as will be described in detail in FIG. 7. The timing signal TIM having a duty ratio of 50% is generated partly by demodulating the series received information, which has been sent from the transmission loop line 1200 to the transmission control unit 400, by the action of the receiver and partly by extracting the timing of the bit interval of the received information. The series received information is sequentially stored in the shift register in response to that timing signal TIM. The parallel output of that shift register is the signal SROUT.

In the frame synchronization unit 100, the synchronization pattern in the frame synchronization region, which is set in a synchronous pattern generator 101, and the information SROUT, which is stored in the shift register of the frame synchronization region, are compared at a coincidence detection circuit 102 upon each reception of one bit. If the coincidence is detected, a coincidence flip-flop 103 is set through an AND gate 104.

By setting that flip-flop 103, a synchronization counter 106 is operated through an AND gate 105 so that the counting operation of the number of the bits subsequently received is started.

If it is detected by a decoder 107 that the value of the synchronization counter 106 corresponds to the number (e.g., 10 in the present embodiment) of the bits for one channel, whether the content SROUT of the shift register of the transmission control unit 400 again becomes coincident with the synchronous pattern or not is checked by an AND gate 108. If the coincidence does not occur, the coincidence flip-flop 103 and the synchronization counter 106 are reset through an OR gate 109 by the output of the AND gate 108. Each time one bit is received, the coincidence between the content of the shift register and the synchronous pattern is again sought for.

In case the content of the shift register and the synchronous pattern are continuously coincident, the coincidence detection flip-flop 103 is left set. At this time, a signal is sent from the synchronization counter 106 to a synchronous character counter 110 to increment the synchronous character counter 110. Thus, if the channel coincident with the synchronous pattern is continuously received, the number of the characters is counted in the synchronous character counter 110. If the channel number of the synchronous region is four, as has been described in the above, the value of the counter 110 takes three. At the same time, when the content of the synchronous counter 106 takes a value, e.g., three after the synchronous character of the next fourth channel has been detected, namely, the capability of attaining the coincidence continuously for four channels is detected by the decoders 111 and 107, and an output is generated in an AND gate 112 at the timing of the timing signal TIM so that a synchronizing flip-flop 113 is set to indicate that the synchronization holds. By that set output, the coicidence flip-flop 103, the synchronization counter 106 and the synchronous character counter 110 are all reset through the OR gate 109, and the output of the AND gate 104 is inhibited. As a result, the coincidence detecting operation is stopped so that the content of the subsequent information channel can be prevented from being erroneously judged as the synchronous channel.

On the other hand, a clock counter 114 is driven by the received timing signal TIM thereby to generate clocks for instructing the timing at which the shift register output SROUT indicates the information of one channel.

For this purpose, when a synchronization OK is detected at the AND gate 112, the content of the clock ounter 114 is forcibly set at the value of the synchronization counter 106, i.e., 3, and the phase registration is conducted by making equal the value of the synchronization counter 106 and the value of the clock counter 114. On the other hand, the output of the clock counter 114 is fed to a decoder 115 so that a clock signal CLKI is generated from the decoder 115, when the value of the clock counter 114 is 0.1, and so that a clock signal CLKII is generated when the value of the clock counter 115 is 5 or 6. For a special application, moreover, a clock signal CLKIII is generated when the value of the clock counter 115 is 4. By that clock signal CLKI, as will be described hereinafter, the output of the shift register is transmitted to the receiving register so that the subsequent processings can be made at the information unit of each channel. On the other hand, the present clock signals CLKI to III are generated at all times, because the clock counter 114 is always operated even if it is out of phase, so that the processing operations of the other portions of the node unit are not interrupted.

When the synchronizing flip-flop 113 is set, a channel activation signal CHACT is sent from the frame synchronization unit 100 to the channel control unit 200 thereby to start the channel counter in the channel control unit 200. The counting operation is started at the timing of the clock signal CLKII thereby to count the number of the clock signal CLKII, i.e., the channel number in the frame (excepting the channel number in the synchronous region). When the content of the channel counter reaches the number which corresponds to the channel number of the information channel region (which is indicated at Y in FIG. 2A) in the frame, an end channel signal ENDCH is sent back from the decoder to the frame synchronization unit 100 so that the synchronizaing flip-flop 113 is reset through an AND gate 116. As a result, the synchronization detecting operation thus far described is started so that whether one bit is a synchronous character pattern or not is again checked each time it is received by the shift register of the transmission control unit 400. As a result, the synchronous region of the subsequent frame is checked as to whether it is normally received subsequent to the completion of the preceding frame or not.

By the bit omission of the information to be transmitted through the transmission loop line 1200 or by the source of the bit due to noises, there is invited a case in which the synchronous pattern is not detected in the synchronous region of the subsequent frame. Since, in this case, the channel information in the frame is not correctly acknowledged, synchronization has to be instantly taken once more, and any disposal for interrupting the intervening processing is required. As a result, this shift in synchronization has to be instantly detected.

The detection of that shift in the synchronization is conducted, after the synchronizing flip-flop has been reset by the end channel signal ENDCH indicating the completion of the preceding frame, at the timing at which the value of the clock counter 114 becomes 0, i.e., at which all the information of the head synchronous channel of the synchronous region of the subsequent frame is fed to the shift register of the transmission control unit 400, if the coincidence with the synchronous pattern is not detected, i.e., if the coincidence flip-flop 103 is reset, such that an output is generated from an AND gate 117 to set a synchronous shift flip-flop 118. The synchronous shift signal STOUT, which is the set output of the synchronous shift flip-flop 118, is sent out to the channel control unit 200. That flip-flop 118 is reset by the output fo the flip-flop 113 when the synchronization is attained.

(2) Channel Control Unit 200

Figure 5A:
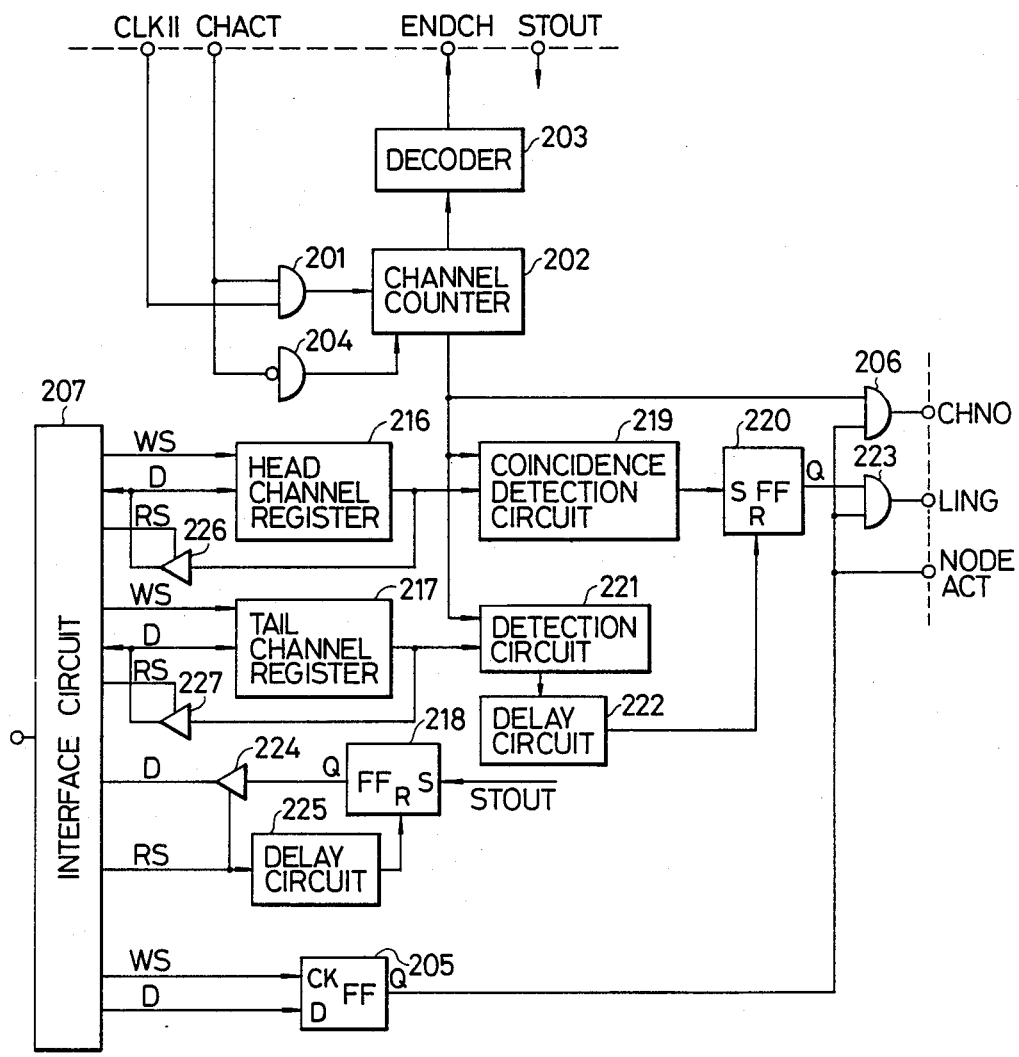
FIGS. 5A and 5B are constructional views showing one embodiment of a channel control unit of the system of the present invention.

FIG. 5A shows one example of the specific construction of the channel control unit 200.

As has been described hereinbefore, if the synchronization holds in the frame synchronization unit 100 so that a channel activation signal CHACT is generated, an AND gate 201 is opened in the channel control unit 200 at the timing of the clock signal CLKII coming from the frame synchronization unit 100 so that the counting operation of a channel counter 202 is started. When the content of the channel counter 202 takes a value corresponding to the channel number of the information channel region in the frame, an end channel signal ENDCH is generated from a decoder 203. When the channel activation signal CHACT from the frame synchronization unit 100 is not generated, the channel counter 202 is reset through an invert gate 204.

The output of the channel counter 202 is sent out as a channel number signal CHNO through an AND gate 206 to the terminal bus 1300 when a node activation flip-flop 205 is set.

Figure 5B:
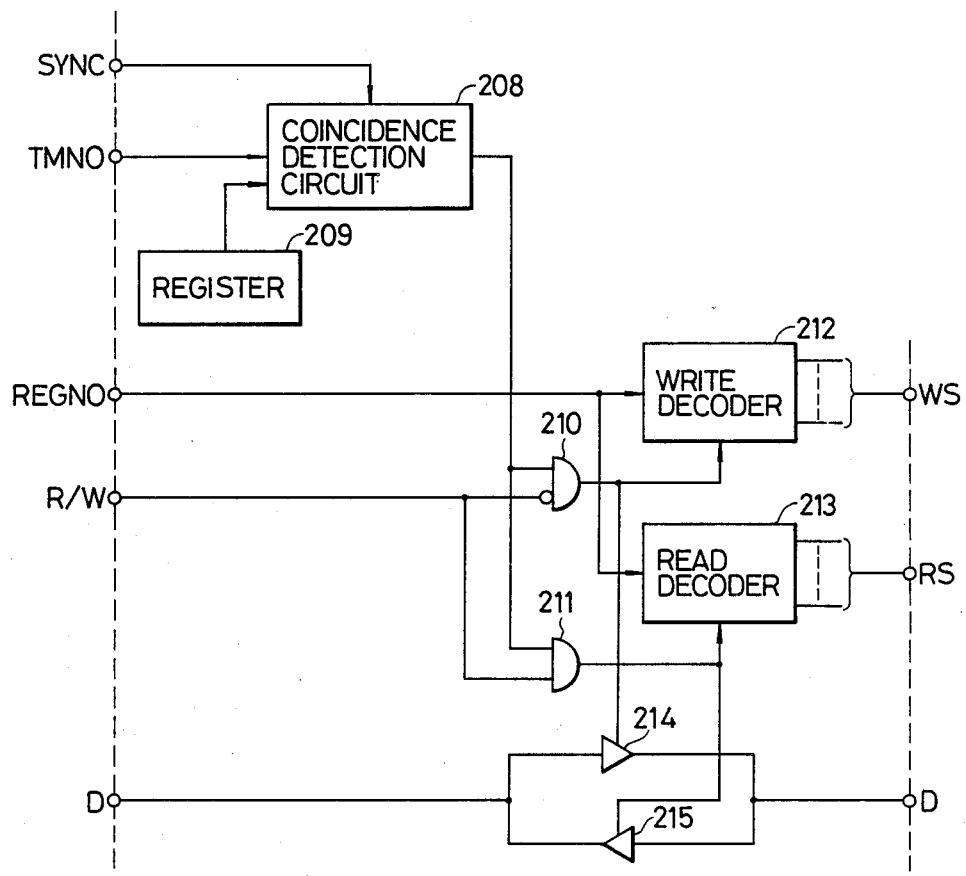

On the other hand, an interface circuit 207 is a circuit for writing and reading data in and out of the register, which is selected by the processing equipment 300, and has such a specific construction as will be shown in FIG. 5B, for example.

The interface circuit 207 shown in FIG. 5B is fed from the processing equipment 300 through the terminal bus 1300 with a synchronization signal SYNC, a terminal number TMNO, a register number REGNO, a read and write control signal R/W and the data D.

In a coincidence detection circuit 208, the terminal number TMNO is compared, when the synchronization signal SYNC is sent to the circuit 108, with the terminal number which comes from a terminal number register 209 and which is assigned to itself. When the two become coincident, an output is generated from an AND gate 210 or 211 in accordance with the read and write control signal R/W so that a write decoder 212 or a read decoder 213 is selected to send a write select signal WS or a read select signal RS to a register corresponding to the register number REGNO coming from the processing equipment. At the same time, a sending gate 214 or a receiving gate 215 is also selected either to write the data D from the processing equipment in the register which is selected by the write select signal WS or to extract and send the content of the register selected to the processing equipment. Incidentally, the element designated by the register number REGNO is not limited to a register but may be an element having a storing function such as a flip-flop.

In FIG. 5A, a register 216 for a line head channel, a register 217 for a line tail channel, a synchronization error flip-flop 218 and the node activation indicating flip-flop 205 are selected by the registar identification REGNO coming from the processing equipment.

The line head channel register 216 and the line tail channel register 217 are stored in advance with the first and last channel numbers of the line switching region of the frame in response to the write or read select signal WS or RS which is sent from the processing equipment through the interface circuit 207. On the other hand, the flip-flop 205 is adapted to be set by the data D at the timing of the write select signal WS when the node equipment is operated.

Moreover, if it is detected by a coincidence detection circuit 219 that the content of the channel counter 202 is coincident with the line head channel register 216, a line switching region flip-flop 220 is set. On the other hand, if it is detected by a coincidence detection circuit 221 that the content of the channel counter 202 is coincident with the line tail channel register 217, the detected signal is delayed for a predetermined period by a delay circuit 222, and the flip-flop 220 is then reset. When this flip-flop 220 is set, an AND gate 223 is opened, if the node activation indicating flip-flop 205 is in its set state, to generate a line gate signal LING, which is sent out to the terminal bus 1300.

In the processing equipment 300, in order to grasp the state of the synchronization error flip-flop 218, the read select signal RS is sent through the interface circuit 207 thereby to open a buffer gate 224 so that the content of the flip-flop is taken in and so that the flip-flop 128 is reset by the signal which has been delayed for a predetermined time by a delay circuit 225.

Moreover, the content of the register 216 or 217 is read out through a buffer gate 226 or 227 in response to the read select signal RS coming from the interface circuit 20.

(3) Processing Equipment 300

Figure 6:
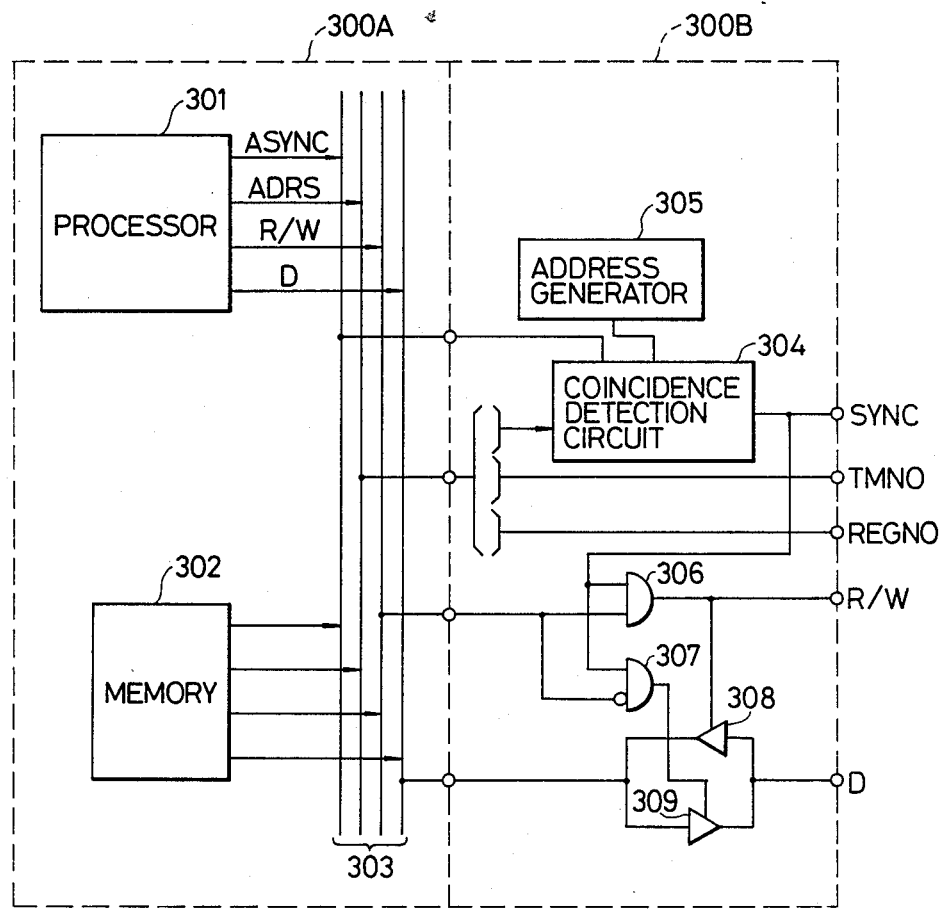
FIG. 6 is a constructional view showing one embodiment of a processing unit of the present invention.

FIG. 6 shows an example of the specific construction of the processing unit 300.

The processing unit 300 is divided into a processing unit 300A and a converting unit 300B, of which the processing unit 300A is composed of at least a processor 301, a memory 302 and a bus 303.

Moreover, the bus 303 connecting the processor 301 and the memory 302 has an address strobe signal ASYNC, an address signal ADRS, a read/write control signal R/W and the data D, all of which are fed to the converting unit 300B. In this converting unit 300B, the higher bits of the address signal ADRS from the processing unit 300A are sent to a coincidence detection circuit 304 so that whether or not the higher bits of the address are the address pattern indicating the access to the interface circuit, which is set in an address generator 305, is checked at the timing of the adress strobe signal ASYNC. If the coincidence takes place, the synchonization signal SYNC is prepared. On the other hand, the lower bits of the address ADRS are sent, as they are, as the terminal number TMNO and the register number REGNO.

Moreover, the read/write control signal R/W is sent out through an AND gate 306 at the timing of the synchronization signal SYNC, and buffer gate 308 or 309 is opened by the AND gate 306 or 307 thereby to send or receive the data D.

The various signals thus generated are sent not only to the interface circuit of the aforementioned channel control unit 200 but to the interface circuits of the link control unit 600 and the packet interface unit 800.

(4) Transmission Control Unit 400

Figure 7:
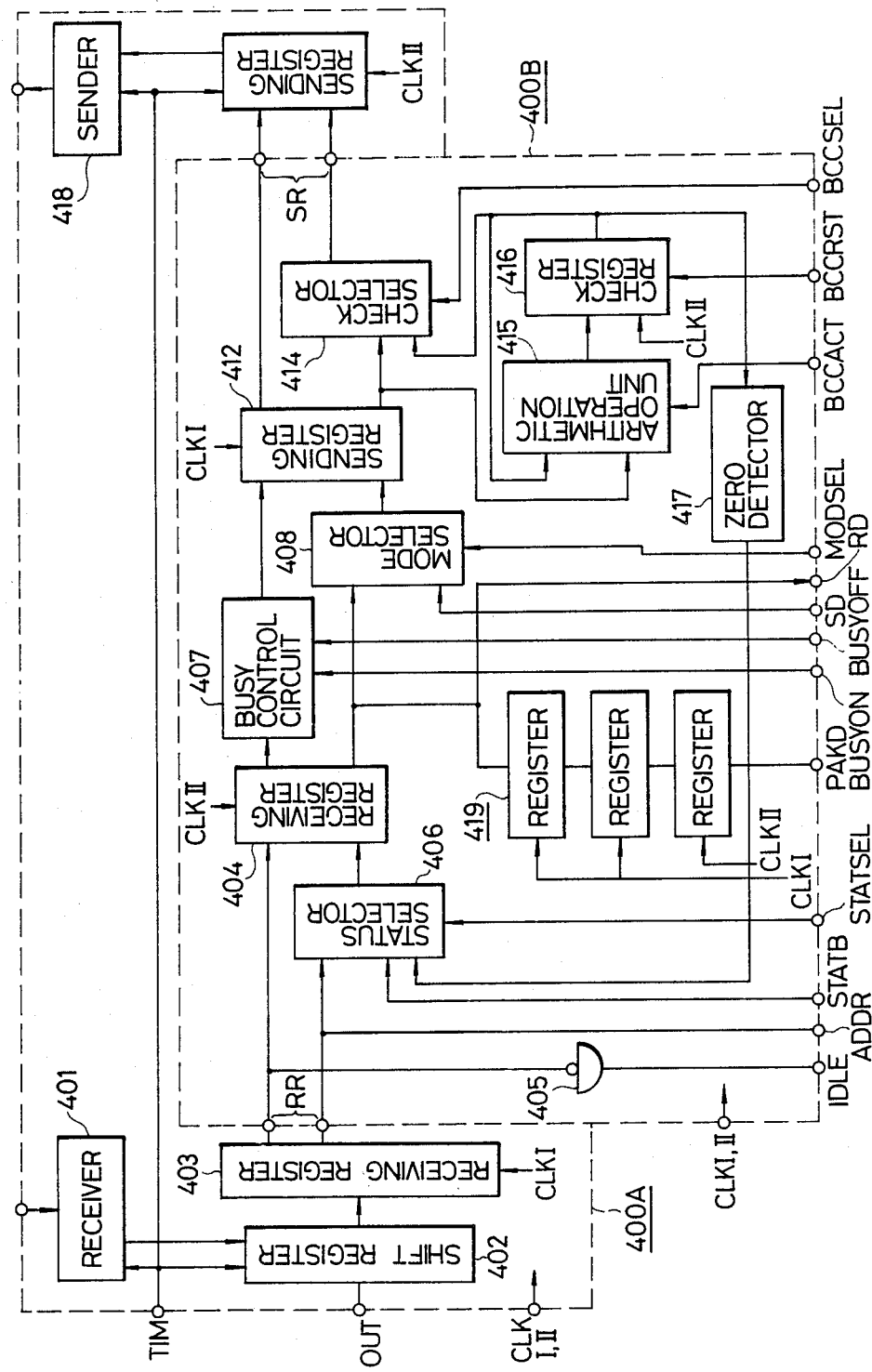
FIG. 7 is a constructional view showing one embodiment of a transmission control unit of the system of the present invention.

FIG. 7 shows an example of the specific construction of the transmission control unit 400, which is composed of the sending and receiving unit 400A and a transmission unit 400B.

In the sending and receiving unit 400A, the information from the transmission loop line 1200 is received by a receiver 401 and demodulated, whereas the bit timing signal TIM fo the received information is extracted from that demodulated information so that the information is sequentially stored in a shift register 402 at the timing of that timing signal TIM.

Next, at the rise of the clock signal CLKI from the aforementioned frame synchronization unit 100, the outputs of ten bits of the shift register 402 are set in parallel in a receiving register 403.

In the transmitting unit 400B, on the other hand, the two bits of the validity indicating bits and the busy indicating bits in the output of the receiving register 403 are sent as they are to the receiving register 404, and the busy bits are sent out as a busy indicating signal IDLE through a NOT gate 405 to the terminal bus 1300. The remaining data information of 8 bits of the output of the receiving register 403 is fed as the address referring signal ADDR partly to the packet control unit 700 and partly to one of the inputs of a status selector 406. Moreover, the other input of the status selector 406 receives both a status signal STATB from the packet control unit 700 and the status signal indicating whether the aforementioned error exists or not. In that status selector 406, the data to be sent out is selected in accordance with a status selector signal STATSEL coming from the packet control unit 700. More specifically, without said signal, the output of the receiving register 403 is selected, whereas the status signal STAB or the like, i.e., the other input is selected with said signal existing.

On the other hand, the status selector signal STATSEL is sent, when it is necessary to return the status at a sixteenth channel while the link control packet region is being received, thereby to select the status signal STATB and the output of a zero detector 417. The selection signal of the status selector 406 is sent to the receiving register 404. In this receiving register 404, the input data is set in response to the clock CLKII from the frame synchronization unit 100. The busy indicating bit in the output of the receiving register 404 is fed to a busy control circuit 407 so that it is sent out as the reception data RD of the remaining nine bits to the terminal bus 1300 and to one input of a mode selector 408. Moreover, the output of 8 bits of the data information of the receiving register 404 is fed to the register 1, which is provided in the form of a FIFO memory 409. In the FIFO memory 409, the output of the receiving register 404 is sequentially stored at the timing of the clock CLKI in registers 409-1 and 409-2 and at the timing of the clock CLKII in the register 409-3.

As a result, the received data to be derived from the FIFO memory 409 is delayed two channels and is sent as packet reception data PAKD to the link control unit 600. Here, the use of FIFO memory 409 is made because the destination address in the link control packet is the third channel thereby to make it necessary to take in the reception data by judging that the destination address is its own address.

The other input of the mode selector 408 is fed with the sending data SD coming from the terminal bus 1300. In that selector 408, when a mode select signal MODSEL from the packet control unit 700 is not generated, the sending data SD is selected, and when the mode select signal MODSEL is not generated, the output from the receiving register 404 is selected.

The busy control circuit 407 forces the busy indicating bit in the received information to be set to indicate the busy state, when a busy-on signal BUSYON from the packet control unit 700 is generated, and to be reset to indicate the idle state when a busy-off signal BUSY-OFF is generated. When in the other operations, the busy control circuit 407 has a function to feed out the signal from the receiving register 404 as it is.

Next, the outputs of the busy control circuit 407 and the mode selector 408 are set in a sending register 412 at the timing of the clock CLKI. Of the output of the sending register 412, the busy indicating bits and the validity indicating bits are fed as they are to a sending register 413 of the sending/receiving unit 400A. On the other hand, the data information of the remaining 8 bits is fed to a check selector 414 and an arithmetic operation unit 415.

A check register 416 is initially set at 0 by a reset signal BCCRST from the packet control unit 700 and then operates the arithmetic operation unit 415 in response to the check operation starting signal BCCACT from the packet control unit 700 thereby to arithmetically operate on the output of the check register 416 and the output of the sending register 412 so that the result is set in the check register 416 at the timing of the clock CLKII. The present arithmetic operation is a division by a predetermined constant and is a system which is generally used as the transmission information check. The operations thus far described are repeated while the data information of 1 to 14 channels of the link control packet region, for example. At the fifteenth channel, the check select signal BCCSEL is sent from the packet control unit 700 to the selector 414 so that this selector 414 selects the output of the arithmetic operation unit 415 at that timing and sends it out to the sending register 413.

The zero detector 417 has a function to detect that all the bits of the arithmetic operation unit 415 are at a predetermined value, e.g., 0, and feeds its output together with the status signal STATB to the status selector 406. In short, the zero detector 417 detects whether or not there is an error in the data information in dependence upon whether all the arithmetic operation results of the respective bits of the data information of the first to fifteenth channels in the link control packet region are zero, for example, and carries the result on the sixteenth channel in the packet region.

In the sending register 413 of the sending/receiving unit 400A, the outputs of the sending register 412 and the check selector 414 are set at the timing of the clock CLKIII from the frame synchronization unit 100, and its content is then shifted bit by bit by the timing signal TIM and sent to the transmission loop line 1200 through a sender 418.

As has been described hereinbefore, moreover, in the frame synchronization unit 100, the clock timings are generated even if the frame synchronization does not hold so that the received information can always be transmitted.

(5) Terminal Control Unit 500

Figure 8A:
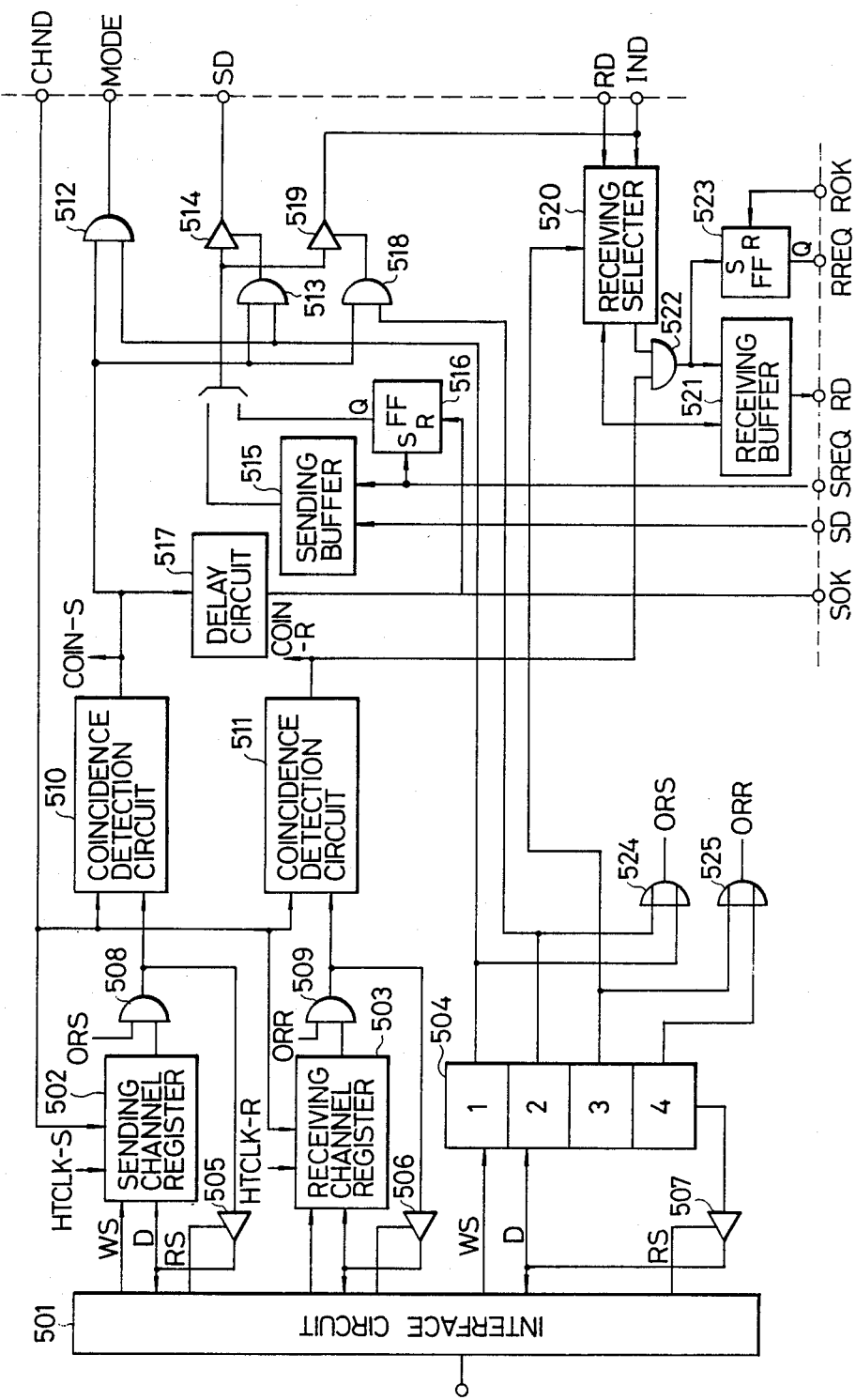
Figure 8B:
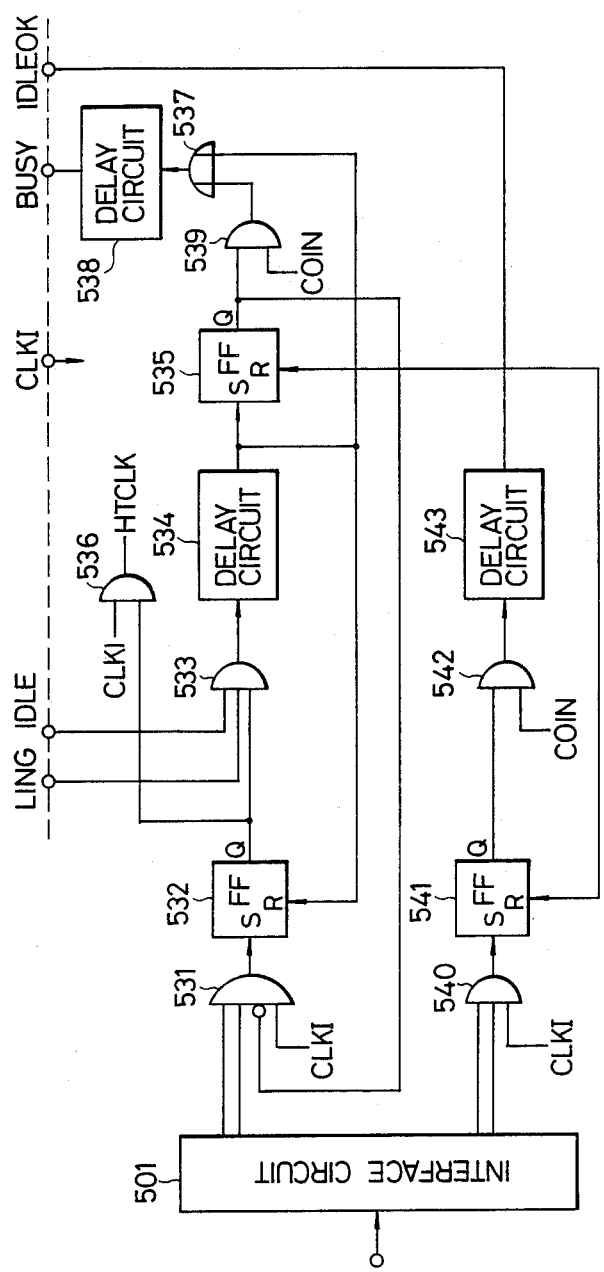

FIGS. 8A and 8B show an example of the specific construction of the terminal control unit 500, which is constructed of a basic unit and an idle channel selecting unit shown in FIGS. 8A and 8B, respectively.

In the basic unit of FIG. 8A, an interface circuit 501 is constructed of a circuit similar to that of FIG. 5B for sending and receiving data to and from the processing unit 300.

A sending channel register 502 is adapted to store the channel number in the line switching region to be sent. A receiving channel register 503 is adapted to store the channel number in the line switching region to be received. Moreover, the content of a mode register 504 has information of four bits, of which two bits 504-1 and 504-2 show the bus linking methods when in the sending operation. The bit 504-1 indicates the case in which the data is sent to the transmission loop line 1200 through the sending in the terminal bus 1300, whereas the bus 504-2 indicates the case in which the data is sent to another terminal control unit in the same node unit through the internal bus in the terminal bus 1300.

On the other hand, the remaining two bits 504-3 and 504-4 of the mode register 504 show the bus connecting methods when in the receiving operation. The bit 504-3 shows the case in which the data is received from the transmission loop line 1200 through the receving bus of the terminal bus 1300, whereas the bit 504-4 shows the case in which the data is received from another terminal control unit in the same node unit through the internal bus of the terminal bus 1300.

Those sending channel register 502, receiving channel register 503 and mode register 504 are made operative to set the data D in response to the write select signal WS coming from the interface circuit 501. Moreover, the outputs of those registers 502, 503 and 504 are taken into the interface circuit 501 through buffer gates 505, 506 and 507, respectively, in response to the read select signal RS.

Still, moreover, the sending and receiving channel registers 502 and 503 renew and register with the channel number CHNO at the timing of the clock CLKI after the request to hunt, as will be described in detail with reference to FIG. 8B, so that they can register with that channel number at last when the idle channel is established in the line switching region. Only when there is the output of an OR gate 524 for detecting that either of the bits 504-1 and 504-2 belonging to the mode register 504 for instructing the sending operation are present, will the output of the sending channel register 502 be fed through an AND gate 508 to a coincidence detection circuit 510.

Likewise, it is detected by an OR gate 525 that either of the bits 504-3 and 504-4 belonging to the sending mode register 504 is set, and the output of the channel register 503 is fed through an AND gate 509 to a coincidence detection circuit 511.

Incidentally, the data from the processing equipment 300 is set through the interface circuit 501 in the registers 502 and 503 in case the control packet is received from the destination and registers with the sending-/receiving channel numbers.

After the registers 502 to 504 have been set with the data, the coincidences between the contents of the sending channel register 502 and the receiving channel register 503 and the channel number signal CHNO are detected by the coincidence detection circuits 510 and 511.

When the coincidence between the channel number signal and the content of the sending channel register 502 is detected by the coincidence detection circuit 510, an AND gate 512 is opened to send a mode signal MODE to the terminal bus 1300, if the content of the bit 504-1 of the register 504 takes a value of 1, and a buffer gate 514 is opened through an AND gate 513 to send the content of a sending buffer 515 to the terminal bus 1300. In the terminal 1000, on the other hand, if the sending data is prepared, the sending buffer 515 is set with the sending data SD of 8 bits in response to the sending requiring signal SREQ, and a sending requiring flip-flop 516 is set so that the output signal of said flip-flop 516 is sent in the form of a validity indicating bit as the sending data SD together with the data information to the transmission control unit 400 when the buffer gate 514 is opened. In the transmission ontrol unit 400, as has been described hereinbefore, the mode selector is operated in response to the mode select signal MODSEL corresponding to the mode signal MODE thereby to send the sending data SD to another node unit.

The signal, which is delayed from the coincidence output of the coincidence detection circuit 510 by a delay circuit 517, is sent as a sending OK signal SOK to the terminal 1000 whereas the sending requiring flip-flop 516 is reset. As a result, if the coincidence of the channel signal is detected before the sending data from the termninal 1000 is prepared, the validity indicating bit of the sending data SD takes a value of 0, because the sending requiring flip-flop 516 has already been reset before the data is sent, thereby to indicate that the sending data is invalid. In short, in case the processing speed of the terminal 1000 is so slow that the sending data is not prepared, the restriction to the processing speed of the terminal 1000 is eliminated by the invalidity indication.

Next, when the coincidence is detected by the coincidence detection circuit 510, a buffer gate 519 is opened by an AND gate 518, if the bit 504-2 of the mode register 504 takes a value of 1, to send the aforementioned sending data as internal bus data IND to the internal bus.

On the other hand, if it is detected by the coincidence detection circuit 511 that the output of the receiving channel register 503 is coincident with the channel number from the terminal bus, the following operations are executed in accordance of the contents of the bits 504-3 and 504-4 of the mode register 504.

Specifically, a receiving selector 520 is fed both the receiving data RD from the receiving bus and the receiving data IND from the internal bus so that it selects the receiving data RD, when the bit 504-3 of the mode register 504 takes a value of 1, and the internal bus data IND when the bit 504-4 takes a value of 1. Of the data thus selected, the data information is fed to a receiving buffer 521, and the validity indicating bit is applied to an AND gate 522. In response to both the validity indicating signal of the validity indicating bit and the coincidence signal of the coincidence detection circuit 511, the output of the AND gate is turned on so that the output of the receiving selector 520 is set in the receiving buffer 521 and so that a reception requiring flip-flop 523 is set. The set output of that flip-flop 523 is sent out as a reception requiring signal RREQ to the terminal 1000, and the content of the receiving buffer 521 is sent out as the receiving data RD to the terminal 1000. If the reception requiring signal RREQ is received at the terminal 1000, a reception OK signal ROK is returned to reset the reception requiring flip-flop 523.

Thus, only when the validity indicating bit is made to indicate validity by the AND gate 522 will the reception data be taken into the terminal 1000. As a result, the data is received, only when it is sent out as complete data by the terminal at the sending side, so that the data sending and receiving operations can be conducted irrespective of the speed at the side of the terminal.

Next, the idle channel selecting function will be described with reference to FIG. 8B. Incidentally, there is shown in FIG. 8B only the circuit which has a relationship with the idle channel selecting function when in the sending or receiving operation. In fact, however, the two circuits of FIG. 8B are provided to correspond to the sending and receiving operations.

With the construction described in the above, if a request to hunt is sent from the processing unit 300 by way of the interface circuit 501, an AND gate 531 is opened at the timing of the clock CLKI to set a hunt requesting flip-flop 532. When the hunt requesting flip-flop 532 is set, the hunting operation is performed to feed an AND gate 533 with the line gate signal LING indicating the reception of the line switching region, the idle indicating signal IDLE indicating that the channel of the receiving data is idle, and the output of the hunt requesting flip-flop 532. When the aforementioned hunting conditions are satisfied, an idle channel acquiring flip-flop 535 is set, and the hunt requesting flip-flop 532 is reset after the output signal from the AND gate 533 is delayed in a delay circuit 534 for a predetermined time period. On the other hand, while the hunt requesting flip-flop 532 is being set, an AND gate 536 is opened by the clock CLKI to acquire a signal HTCLK. This signal is fed to the channel register 502 or 503 of FIG. 8A so that the channel register signals CHNO are sequentially taken at that timing into the channel register 502 or 503 and renewed. As has been described hereinbefore, if the idle channel is detected so that the hunt requesting flip-flop 532 is reset, the introducing operations of the registers are stopped. At last, therefore, the channel number corresponding to the idle channel is stored in the register.

The output signal of the delay circuit 534 is fed through an OR gate 537 to a delay circuit 538, in which it is delayed for a predetermined time period and from which it is sent as a busy signal BUSY to the packet control unit 700 so that it is converted into the busy-on signal BUSYON. As a result, the busy indicating bit of the corresponding channel being transmitted through the transmission control unit 400 is made to indicate the busy state thereby to prohibit the hunting operation at another terminal. After the hunting condition holds, coincidence output COIN-S or COIN-R of the coincidence detection circuit 510 or 511 of FIG. 8A is subsequently fed through an AND gate 539 and the OR gate 537, in which it is delayed for a predetermined time period. After that, the delayed signal is likewise sent out as the busy signal BUSY to make the busy indicating bit indicate the busy state. Incidentally, the delay circuit 538 is provided to hold the correct timing.

After the flip-flop 535 is set so that the hunting condition is satisfied, the AND gate 531 is closed by that set output to prohibit the subsequent request to hunt thereby to prevent the double channel hunting operations.

On the other hand, when the data sending or receiving operation is completed to release the occupied channel, the write select signal WS is sent out of the interface circuit 501 in response to the instruction of the processing equipment 300, and an AND gate 540 is opened at the timing of the clock CLKI to set a release requesting flip-flop 541. And, the coincidence is awaited between the content of the channel register 502 or 503 of FIG. 8A and the channel number signal SHNO. If the coincidence detection circuit 510 or 511 detects the coincidence so that a signal COIN-S or COIN-R is fed out, the output from an AND gate 542 is delayed for a predetermined time period in a delay circuit 543 for the timing adjustment. After that, an idle indication OK signal IDLEOK is sent out to the packet control unit 700, and the busy-off signal BUSYOFF is sent to the transmission control unit 400 so that the busy indicating bit of the occupied channel is forced to indicate the idle state.

At the same time, the release requesting flip-flop 541 and the idle channel acquiring flip-flop 535 are reset to complete the releasing operations.

Incidentally, so that the plural terminal control units in the same node unit may not be brought into the hunt requesting state, only one operation is always effected by the program control in the processing unit so that plural terminal control units may be prevented from hunting the idle channel.

Figure 8C:
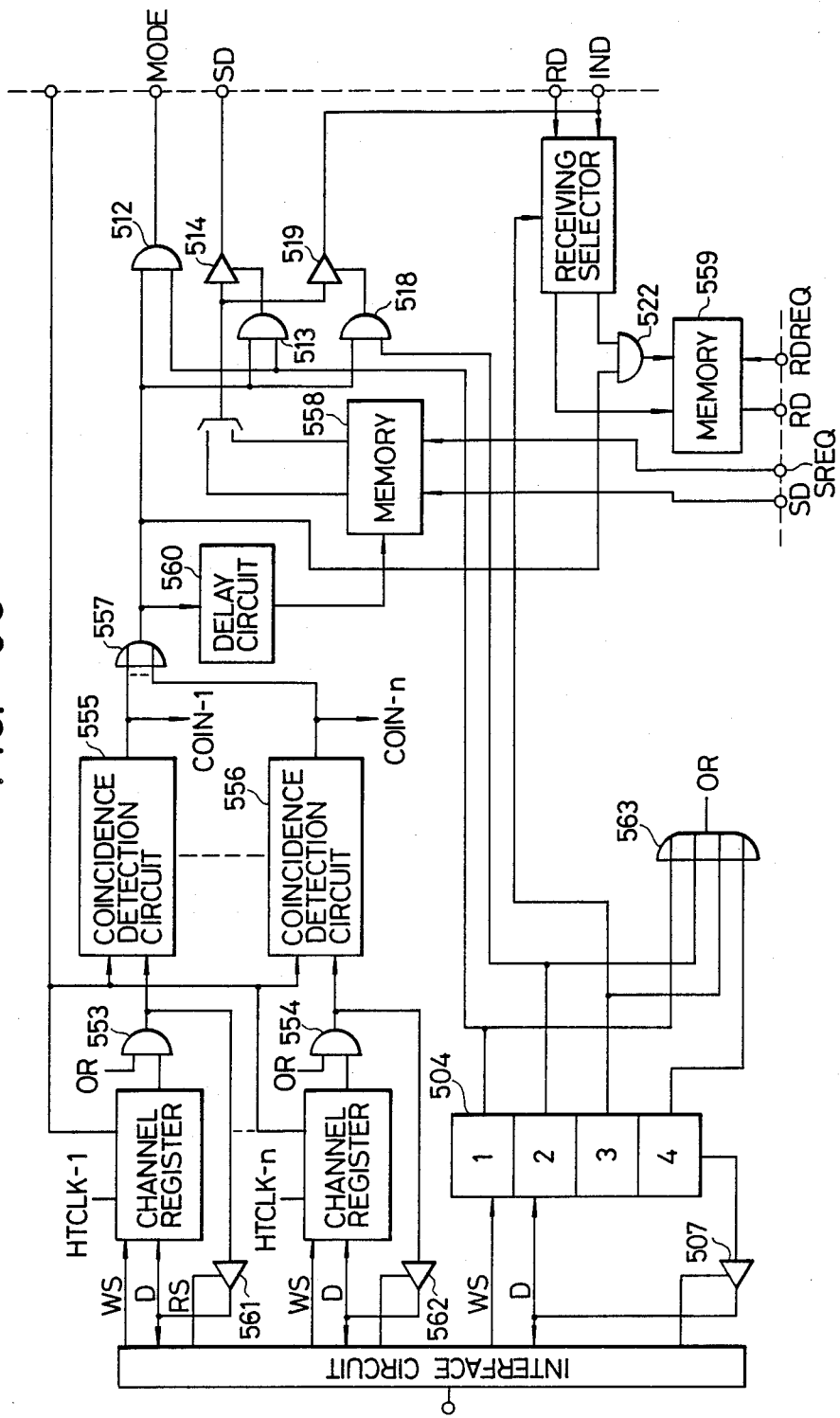

The embodiments thus far described are directed to the case in which only one channel is occupied for each terminal unit thereby to execute the sending or receiving operation. However, a plurality of channels may be assigned for each terminal unit. FIG. 8C shows the construction of one example of the major portion of the basic portion of the terminal control unit of that modification.

In the same Figure, channel registers 551 and 552 are commonly used for the sending and receiving operations. The coincidences between the contents set in those registers and the channel number signal CHNO are detected by coincidence detection circuits 555 and 556 so that a coincidence is derived from an OR gate 557 if it is detected by either of the coincidence detection circuits.

On the other hand, in order to adjust the speed of the sending and receiving terminal interface, FIFO memories 558 and 559 are provided for the sending and receiving operations, respectively.

The former FIFO memory 558 is stored with a validity indicating bit, which indicates that the data is valid, together with the sending data SD at the timing of the sending requesting signal SREQ which is sent from the terminal 1000.

If the coincidence is detected, as has been described hereinbefore, that detected signal is delayed in a delay circuit 560 for a predetermined time period so that the sending data stored in the FIFO memory 558 is read out at the timing of that delayed signal. At this time, in case the data is to be sent, the same operations as those described with reference to FIG. 8A are conducted in accordance with the contents of the bits 504-1 and 504-2 of the mode register 504.

In case the data is to be received, on the other hand, the reception data RD or the internal bus data IND are selected by the selector 520 in accordance with the contents of the bits 504-3 and 504-4 of the mode register 504, as has been described with reference to FIG. 8A. When the data selected is valid, it is sequentially stored in the FIFO memory 559 so that the contents are read out at a predetermined timing and sent out as the reception data RD to the terminal 1000.

In a manner to correspond to the channel register 551, on the other hand, there is provided a circuit which has a idle channel selecting function, as shown in FIG. 8B. In this case, the output signals HTCLK-1 to HTCLK-n of the AND gate 536 are applied to the channel registers 551 and 552 so that the channel numbers CHNO are sequentially taken into the channel registers 551 and 552 and renewed at the timings of those output signals. Moreover, the logic sum of the outputs of the respective bits of the mode register 504 is taken by an OR gate 563 so that the outputs of the channel registers 551 and 552 are fed through the AND gates 553 and 554 to the coincidence detection circuits 555 and 556 only when one of the bits of the mode registers 504 is set with a value of 1. Still moreover, the coincidence outputs COIN-1 to COIN-n of the coincidence detection circuits 555 and 556 are applied to the AND gates 539 and 542, respectively.

Furthermore, the output, which is the logic sum of the outputs of the delay circuits 538 taken by the OR gate, is sent out as the busy signal BUSY, and the logic sum of the outputs of the delay circuits 543 is similarly taken so that the resultant output is sent out as the idle indication OK signal IDLEOK.

In response to the read select signal RS from the interface circuit 501, furthermore, buffer gates 561 and 562 are opened so that the contents of the channel registers 551 and 552 can be taken into the processing unit.

In the embodiment thus far described, any arbitrary two of the plural terminal control units in the same node unit can be communicated with by using the mode register 504 and the internal bus. This fact will be described in detail with reference to FIG. 8D.

FIG. 8D shows the linking connection among the transmission control unit 400 and a plurality of terminal control units 500A and 500B. The terminal bus 1300 is composed of buses necessary for linking them, i.e., a bus 1301 for the mode signal MODE, a sending bus 1302 for the sending data SD, a receiving bus 1303 for the reception data RD, and internal bus 1304 for the internal bus data IND, and a bus 1305 for the channel number signal CHNO.

In case communication is to be effected between the terminal control units 500A and 500B in the same node unit, the values of the receiving channel register 502 and the receiving channel register 503 in the terminal control units 500A and 500B are set at idential channel numbers, respectively.

Next, one example of the method for setting the channel number will be described in the following. At one terminal control unit, e.g., 500A at the sending side, if an idle channel is sought for and found, its channel number is set in the sending channel register 502. In the processing equipment 300, the channel number set in that register 502 is read, and the identical channel number is set in the receiving channel register 503 in the same terminal control unit 500A and in the sending and receiving channel registers 502 and 503 in another terminal control unit 500B. In the processing unit, moreover, the bits 504-2 and 504-3 of the mode register 504 in the terminal control unit 500A are set to take a value of 1 so that the receiving side and the sending side may instruct the links to the receiving bus 1303 and 1304, respectively. In the mode register 504 in the terminal control unit 500B, the bits 504-1 and 504-4 are set to take a value of 1 so that the receiving side and the sending side may instruct the links to the internal bus 1304 and the sending bus 1302, respectively.

Thus, the sending information coming from a sending unit 590B of the terminal control unit 500B is sent through the sending bus 1302 to the transmission control unit 400, as indicated by thick lines in FIG. 8D. Likewise, the mode signal is sent through the bus 1301 to the transmission control unit 400.

In this transmission control unit 400, the sending information is carried on the channel of the set number and sent out to the transmission loop line 1200 in response to the mode signal of the bus 1301. Thus, the information loop passage 1200 is taken into the transmission control unit 400 and sent through the receiving bus 1303 to the receiving unit 591A of the terminal control unit 500A.

On the other hand, in case information is to be sent out of the terminal control unit 500A to the terminal control unit 500B, as shown by the thick lines in FIG. 8D, the sending information is sent out of the sending unit 590A of the terminal control unit 500A to the internal bus 1304, and the data of this internal bus 1304 is received by the receiving unit 591B of the terminal control unit 500B.

Moreover, the broken lines appearing in the Figure indicate the passages of the signals in the case contrary to the aforementioned one.

Figure 8E:
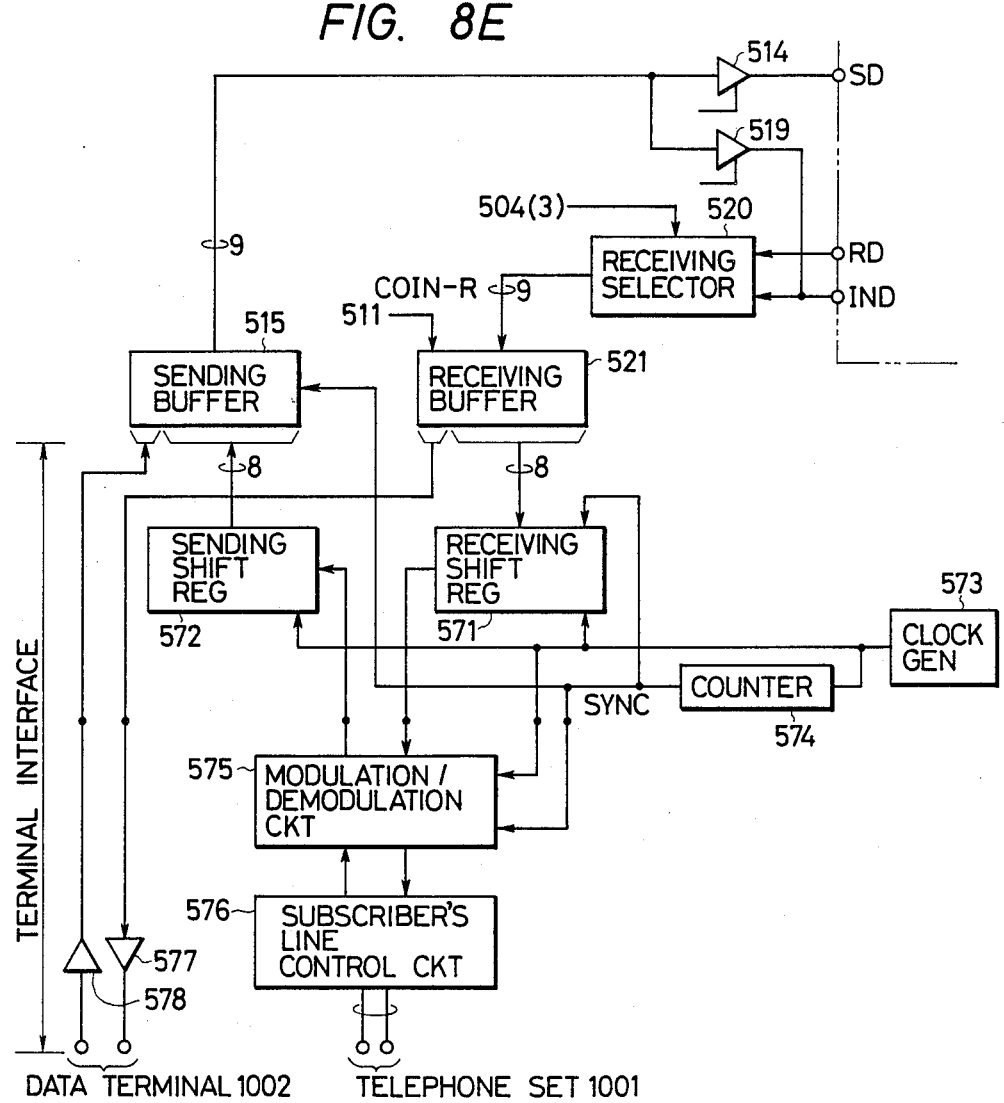
FIGS. 8E and 8F are a constructional view and a signal waveform diagram showing another embodiment of the transmission control unit of the system of the present invention.

FIG. 8E shows major portions of another example of the specific construction of the basic portion of the terminal control unit 500, i.e., the portions corresponding to the sending buffer 515, the buffer gates 514 and 519, the receiving selector 520 and the receiving buffer 521 at the righthand side of FIG. 8A, and the interface unit with the terminal equipment 1000. The remaining construction is substantially identical to that of FIG. 8A but is different therefrom only in that the flip-flop 516 and the AND gate 522 are omitted. FIG. 8E shows the construction in case signals are transmitted through the channels of the construction shown in FIG. 8K by the terminal 1000 having a telephone and a data terminal so that the data communication can be conducted while conversatons are being effected by the telephone.

As shown, as has been described hereinbefore, the bus information of either the receiving bus RD or the internal bus IND of the terminal bus 1300 is selected by the receiving selector 520 in accordance with the third bit of the mode register 504 (which should be referred to FIG. 8A) and sent to the receiving buffer 521. If the value of the receiving channel register 503 (which should be referred to FIG. 8A) and the channel number in the frame become coincident, the signal COIN-R signal is generated, and the aforementioned information is set in the receiving buffer 521. The COIN-R signal is generated each 125 $\mu$s of frame period and for a period of 8 KHz so that the information of one bit for the data is sent out each time of the frame period to a data terminal 1002 by way of a driver 577. By a transmission clock generating circuit 573, on the other hand, a PCM transmission clock of 64 KHz is generated to drive receiving and sending shift register 571 and 572, to effect the count-down of ⅛ in a count circuit 574 and to generate the SYNC signals divided for each eight bits. The SYNC signal is transmitted to a modulating/demodulating device 575 to indicate the divisions of the series bits of the output of the shift register 571 and to set the eight bits of the voice PCM data of the nine bits of the reception information of the receiving buffer 521 in the receiving shift register 571.

Similarly in the sending operations, the series signal from the modulating/demodulating device 575 is taken into the sending shift register 572 in response to the transmission clock and is set in the sending buffer 515 in response to the SYNC signal by which the setting operation of the PCM information of eight bits is completed. At the same time, the reception information coming from the data terminal 1002 by way of a receiver 578 has its one bit taken into the sending buffer 515. The information of nine bits of the sending buffer 515 is sent to the terminal bus 1300 by way of the buffer gate 514 or 519.

The modulating/demodulating device 575 has a function to convert the PCM signal of eight bits sent and received into an analog signal and is linked to the line of a telephone 1001 by way of a circuit such as a subscriber's line control circuit 576. However, this has no direct relationship with the present invention, and its detailed description is omitted.

Figure 8F:
Figure 8F:
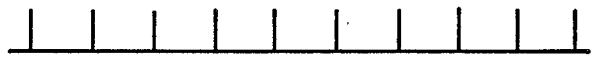
Figure 8F:

As has been described in the above, the data information is sampled for a predetermined period of 8 KHz of the SYNC signal so that the sending and receiving signal from the data terminal is transmitted. The data signal is reproduced, if it has a transmission speed as high as one tenth to one half of 8KHz, in response to the SYNC signal of 8 KHz, as shown in FIG. 8F, although it is followed by more or less delay (less than 125 μs). Thus, the simultaneous transmissions are made possible. Incidentally, FIG. 8F(a) illustrates the sending data from the data terminal 1002; FIG. 8F(b) illustrates the SYNC signal; and FIG. 8F(c) illustrates the transmission information to the terminal bus 1300.

In another example of application, the ON/OFF signal of the telephone line can be absolutely similarly sent in place of the data information. As a result, the intermediate transmission of the dial pulse waveforms can be directly conducted.

Figure 8G:
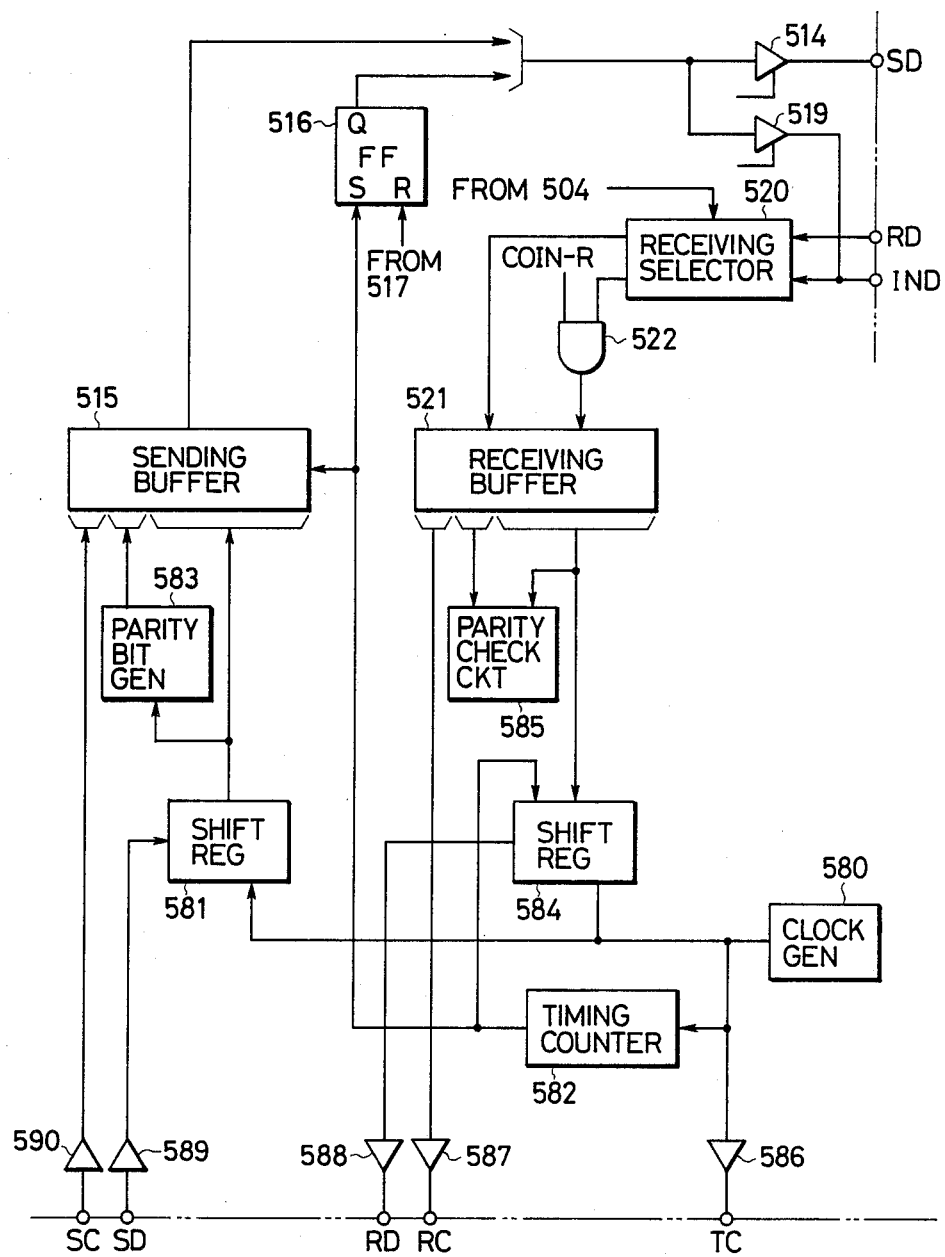
FIG. 8G is a constructional view showing still another embodiment of the transmission control unit of the system of the present invention.

FIG. 8G shows one example of the construction of the major portion of the terminal control unit in case the control information bits are contained in the respective channels, as shown in FIG. 2L.

The Figure shows the portions corresponding to the sending buffer 515, the bufffer gates 514 and 519, the receiving selector 520, the receiving buffer 521, the flip-flops 516 and 523 and the AND gate 522 at the righthand side of FIG. 8A. The remaining construction is similar to that of FIG. 8A and is omitted here.

In FIG. 8L, the sending data SD from the terminal 1000 is set in a sending shift register 581 in response to the clock coming from a clock generation unit 580 for generating the transmission clock with the terminal 1000.

On the other hand, the content of a counter circuit 582 is counted down in response to the transmission clock thereby to generate the signal SYNC.

In response to that signal SYNC, the content of the sending shift register 581 is transmitted to the sending buffer 515 at the timing at which the sending data of six bits is set in the sending shift register 581. At this time, control information SC from the terminal 1000 is simultaneously set in the sending buffer 515.

From the data information of six bits, which is stored in the sending shift register 581, moreover, a parity bit is generated by a parity generation circuit 583 and is set in the parity bit position of the sending buffer 515.

Similar to the signal SREQ of FIG. 8A, the signal SYNC has functions to set the flip-flop 516 and to generate the validity/invalidity indicating bit V.

Those pieces of information are sent through the gates 514 and 517 to the terminal bus 1300.

On the other hand, the reception information from the terminal bus 1300 is sent through the receiving selector 520 to the receiving buffer 521 and the AND gate 522. When the signal COIN-R to be generated upon coincidence between the content of the receiving channel register 503 (as shown in FIG. 8A) and the receiving channel is received, the reception is set in the receiving buffer 521 by the AND gate 522 if the validity/invalidity indicating bit V is received.

Of the reception information, the control information bit C is instantly sent as a signal RC to the terminal 1000. On the other hand, the data information D of six bits is transmitted at the timing of the signal SYNC to a receiving shift register 584 and is sent as the reception data RD to the terminal 1000 in response to the transmission clock from the clock generator 580.

Moreover, the data information D of six bits in the receiving buffer 521 and the parity bit P are sent to a parity check circuit 585 thereby to check an error in the data information.

This checked result is sent to the processing equipment 300 through the interface circuit 501 of FIG. 8A, for example.

Incidentally, the transmission clock from the clock generator 580 is sent out, as it is as a signal TC, to the terminal 1000. Moreover, reference numerals 586 to 588 indicate senders, and reference numerals 589 and 590 indicate receivers.

As has been described hereinbefore, the information can be transmitted at a high speed by providing the control bits in the channels.

Especially in case the aforementioned channel construction is applied to such lines as link the fixed special terminal units, the control information can be sent and received in a direct manner once the channel register, the control register and so on of each terminal control unit are set. As a result, communication can be made between the terminal units in an automatic manner without any interposition of the processing unit while simplifying the control.

Link Control Unit 600

The link control unit 600 executes the sending and receiving processings of the packet data (which will be shortly referred to as "link packet data") of the link control packet region A when in the line switching function. The construction and operation of that link control unit 600 are substantially similar to those of the equipment which is made to be operative to send and receive the data when in the packet switching function, except for the terminal interface.

Figure 9:
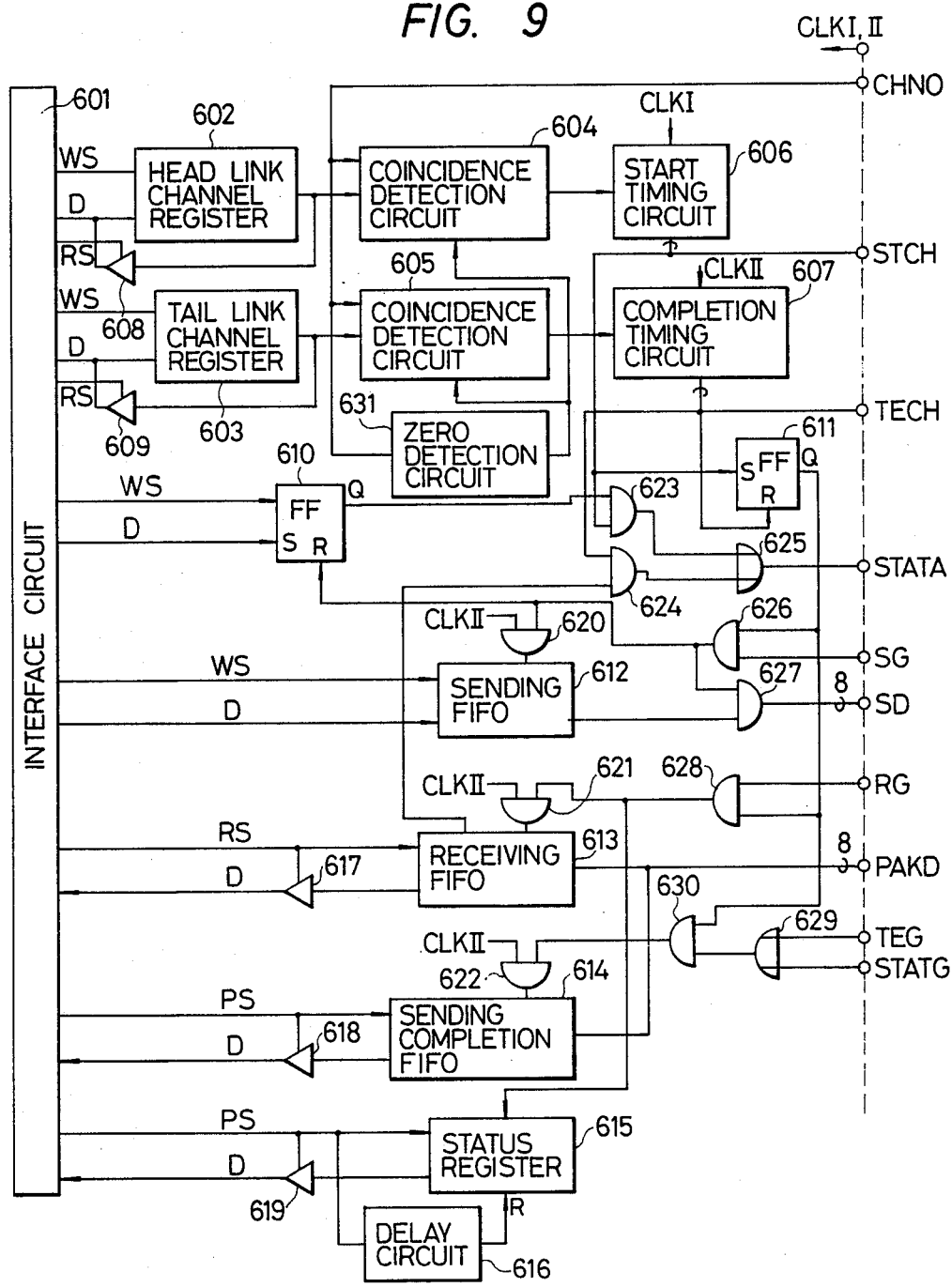
FIG. 9 is a constructional view showing one embodiment of a link control unit of the system of the present invention.

FIG. 9 shows an example of the construction of the aforementioned link control unit 600.

In FIG. 9, reference numerals 602 and 603 indicate registers in which the head channel number and the tail channel number of the joint control packet region A (which will be simply referred to as a "link packet region") from the aforementioned processing unit 300 through an interface unit 601 are initially set. As a result, in the case of the frame construction shown in FIG. 2B, the head link channel register 602 is set with the channel number 5 whereas the tail link channel register 603 is set with the value of the channel number 20. In case the respective registers 602 and 603 are set with the data indicating the channel numbers, these setting operations can be realized by applying both the write select signal WS for designating the address assigned in advance to each register and the data D indicating the channel number to be set to the registers. On the other hand, if read select signal RS for designating the addresses of the respective registers 602 and 603 is applied, the data stored in each register and indicating the channel number is read out through the buffer gates 608 and 609, respectively.

The outputs of both the registers 602 and 603 are applied to coincidence detection circuits 604 and 605, respectively, together with the channel number information CHNO which is sent from the channel control unit 200 through the terminal bus. The coincidence detection circuit 604 generates its output signal when the content of the register 602 and the channel number information CHNO become coincident, whereby a start timing circuit 606 is started. This timing circuit 606 generates a signal in the head channel at the timing which is synchronized with the clock CLKI. On the other hand, the coincidence detection circuit 605 generates an output signal when the content of the register 605 and channel number information CHNO become coincident, whereby a completion timing circuit 607 is started. This timing circuit 607 generates a signal TECH in the tail channel at the timing synchronized with the clock signal CLKII.

By the start of the aforementioned start timing circuit 606, the head channel signal STCH is sent through the terminal bus to a later-described packet control unit 700 thereby to start the sending and receiving controls of the packet data. By the start of the aforementioned completion timing circuit 607, on the other hand, the completion channel signal TECH is likewise sent to the packet control unit 700 thereby to complete the packet sending and receiving controls.

Reference numeral 631 indicates a zero detection circuit which is made operative to generate an output when the channel number CHNO is zero. When this output is generated, the outputs of the coincidence detection circuits 604 and 605 are prohibited. The provision of that circuit 631 is made to prevent the coincidences between the contents of the registers 602 and 603 and the first channel number 0 of the aforementioned synchronous region X, because the contents of the registers 602 and 603 take a value of 0 when the link packet region is not designated in the least, thereby to allow the timing signals STCH and TECH to be erroneously generated.

Next, the sending operations of the packet data will be described in the following.

The packets to be sent are generated by the processing unti 300 and are sequentially written through the interface circuit 601 in a sending FIFO buffer memory circuit (which will be simply referred to as a "FIFO") 612. These writing operations are realized, as has been described hereinbefore, by applying the write select signal WS for designating the address, which has been assigned in advance to the sending FIFO 612, and the packet data D to the aforementioned sending FIFO 612.

After the writing operations of the packet data have been completed, the sending requesting signal is sent out of the processing equipment 300 and is applied through the interface circuit 601 to a flip-flop 610. An AND gate 623 is opened by the output Q of that flip-flop.

If the content of the head channel register 602 and the channel number CHNO become coincident so that the start timing circuit 606 is started, the output of this circuit is sent out as the head channel signal STCH to the terminal bus and is simultaneously applied to the aforementioned AND gate 623. The logic product output of that AND gate 623 is sent out as a status signal STATA through an OR gate 625. That status signal STATA is sent to the packet control unit 700, in which it is multiplied by the timing signal STCH thereby to indicate that the sending operation is requested.

By the output of the aforementioned start timing circuit 606, moreover, a flip-flop 611 is set so that its output Q is applied to AND gates 626 and 628. As a result, it becomes possible to receive a sending gate signal SG which is sent through the terminal bus.

On the other hand, the packet control unit 700 sends out the sending gate signal SG when it acknowleges in view of the head bit of the link packet region A that the region is idle. That sending gate signal SG is applied to an AND gate 620 through the aforementioned AND gate 626. As a result, while the sending gate signal SG is being received, the clock signal CLKII enters the sending FIFO 612 so that the packet data stored in the sending FIFO 612 in synchronism with that clock are sequentially sent out through an AND gate 627. That data SD sent out is applied through the sending bus to the mode selector 408 of the aforementioned transmission control unit 400. Moreover, the sending requesting flip-flop 610 is reset by the sending gate signal SG. As a result, the state awaits the subsequent request to send the data.

When the content of the tail link channel register 603 and the channel number CHNO become coincident, the timing circuit 607 sends out the tail channel signal TECH, as has been described hereinbefore. This tail channel signal TECH enters the packet control unit 700 through the terminal bus. The packet control unit 700 processes the completion of the packet data transmission, as will be described hereinafter, thereby to turn off the sending gate signal SG. As a result, the gates 620 and 627 linked to the sending FIFO 612 are closed to complete the sending operations of the packet data of the link packet region A.

Next, the receiving operations of the packet data sent from the destination node equipment will be described in the following.

In the node equipment for receiving the data, the head channel number and the tail channel number of the link packet region A are set in the registers 602 and 603, respectively, on the basis of the instructions of the processing unit 300. Similar to the foregoing description, if the head channel number set and the channel number CHNO sent through the terminal bus become coincident, the start channel signal STCH is sent out to the packet control unit 700. This packet control unit 700 turns on the receiving gate signal RG, as will be described hereinafter, when it detects the coincidence between the destination address and the address of its own node unit.

The aforementioned receiving gate signal RG is applied to the gate 628 of the link control unit 700, and the packet data PAKD from the transmission control unit 400 is applied to a receiving FIFO 613. Since the flip-flop 611 is set at the timing of the head channel, its output Q opens the AND gate 628. As a result, the receiving gate signal RG is applied through the gate 628 to an AND gate 621. During the time period while that receiving gate signal RG is received, the clock signal CLKII enters the receiving FIFO 613, and the packet data PAKD is synchronously introduced. The packet data stored in the receiving FIFO is read out by the processing equipment 300. Specifically, If the read select signal RS for designating the address of that receiving FIFO 613 is applied, the packet data is sequentially read out by the processing equipment 300 through a gate buffer 617.

On the other hand, the signal indicating the existence of the overflow of the receiving FIFO 613 is applied together with the output of the completion timing circuit 607 to an AND gate 624. If the data stored in the receiving FIFO 613 is in the overflow state at the timing at which the tail channel signal is sent out, an output is generated by the aforementioned AND gate 624 and is sent out as the status signal STATA to the packet control unit 700.

If the tail channel of the link packet region A (which should be referred to FIG. 2B) is detected, the flip-flop 611 is reset by the output signal of the completion timing circuit 607. As a result, the gate 627 is closed to complete the data receiving process.

One bit in a status register 615 is set to be turned on by the fact that the output of the AND gate 628 is turned on or off. The processing equipment 300 sends out the read select signal RS, which is made operative to designate the address assigned in advance in the aforementioned status register 615, so that the completion of the data reception can be indicated by reading in the content of that register 615 through a gate buffer 619. The processing equipment 300 can be informed of that completion of the reception by an interrupting process or the like. The read select signal RS of the status register 615 is applied through a delay circuit 616 to the reset terminal of that register 615. As a result, the register 615 is automatically reset after its content has been read out.

Next, the processing of taking in the packet data, which has been sent out of the sending node equipment, when the data circulates once through the common loop type communication line and returns to the node unit will be described in the following.

The packet control unit 700 detects, when it receives the start channel signal STCH from the link control unit 600, the coincidence between the source address of the head channel and the address of its own node unit. The coincidence between the two addresses means that the data received is that which was sent from its own node unit and has returned after one circulation. If the two addresses become coincident, the packet control unit 700 sends out a tail gate signal TEG, as will be described hereinafter, which is applied through the terminal bus to the link control unit 600. That tail gate signal TEG enters an AND gate 630. As a result, the clock signal CLKII is applied through the aforementioned AND gate 622 to a sending completion FIFO 614, and the packet data PAKD from the transmission control unit 400 is sequentially taken into the sending completion FIFO 614.

As will be described hereinafter, that tail gate signal TEG is generated not during all the time period of the link packet region A but during at least the channel period of the address information (i.e., during the channel period from $A_0$ to $A_3$ in the example of FIG. 2G). On the other hand, a status gate signal STATG is generated only during the channel period of the status information (i.e., during the channel period of $A_{15}$ in the example of FIG. 2G). As a result, the sending completion FIFO 614, which is made operative to take in the packet data PAKD, takes in the data of the channels of $A_0$ to $A_3$ and $A_{15}$ only during the period for which either of the tail gate signal and the status gate signal STATG is generated. This function is to selectively receive only the information which is necessary for the sending completion. Of course, the information other than the aforementioned one may be taken into the sending completion FIFO 614. The processing equipment 300 is enabled to read out the data, which is stored in the sending completion FIFO 614, through a buffer gate 618 by sending out the read select signal which indicates the address assigned to that FIFO 614.

Packet Control Unit 700

The packet control unit 700 is provided to generate the timing signal which is necessary for sending and receving the packet data of both the link packet region A and the packet switching region D. For convenience of explanation, the following description is directed to the the case of sending and receiving the data of the link packet region.

Figure 10:
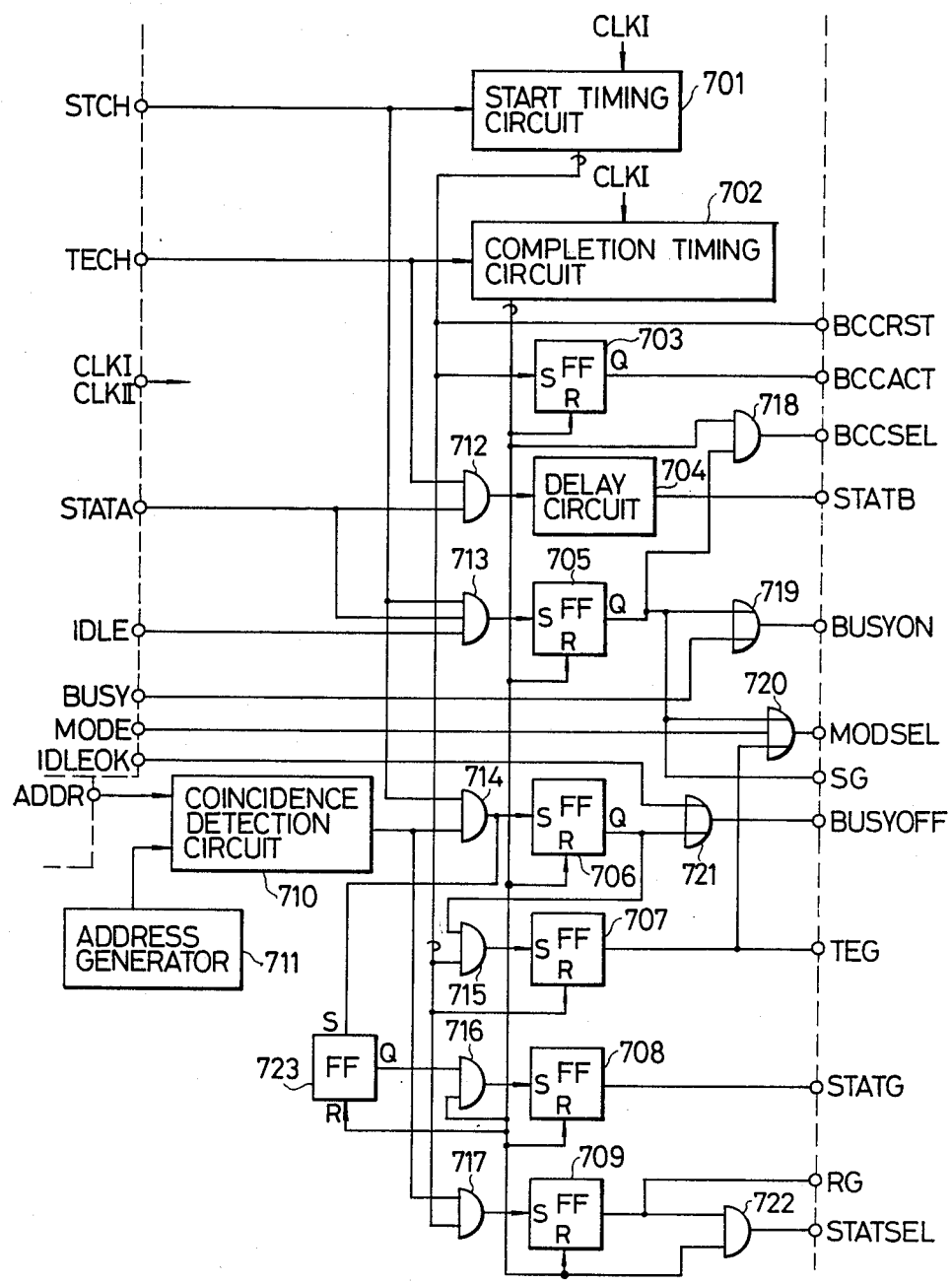
FIG. 10 is a constructional view showing one embodiment of a packet control unit of the system of the present invention.

FIG. 10 shows the circuit construction according to one embodiment of the packet control unit 700.

The start channel signal STCH and the tail channel signal TECH, which are sent from the link control unit 600, are applied to a start timing circuit 701 and a completion timing circuit 702 of the packet control unit 700, respectively. Those timing circuits 701 and 702 are provided to generate both the signal, which is synchronized with the head channel and the tail channel of the link packet region, and the timing signal which is delayed from the former signal by an arbitrary channel. On the basis of those timing signals, such a timing signal is prepared as is necessary for sending and receiving the data, as will be described in the following.

First of all, the operations of sending and receiving the packet data will be described in the following.

As has been described hereinbefore, the status signal STATA sent from the link control unit 600 represents a request for the packet data to be sent. In the case of this request, the packet control unit 700 starts to hunt for the idle packet region.

First, the busy indicating bit $A_{00}$ (as shown in FIGS. 2F and 2G) of the head channel $A_0$ of the link packet region A, i.e., the content of the idle signal IDLE is checked. It is indicated that the link packet region is idle, when the idle signal IDLE is on (or "1"), and that the link packet region is busy when the idle signal IDLE is off (or "0"). When the idle signal IDLE is off, an AND gate 713 is closed so that the sending operation is not started while awaiting the next arrival of the head channel.

In case the idle signal IDLE is on, a sending flip-flop 705 is set by the output of the AND gate 713 so that its output Q is sent out as the sending gate signal SG to the link control unit 600. This link control unit 600 sequentially sends out the stored data of the sending FIFO 612 to the transmission control unit 400 when it receives that sending gate signal SG, as has been described hereinbefore. At the same time, the output Q of the aforementioned flip-flop 705 is applied as the mode select signal MODSEL through an OR gate 720 to the transmission control unit 400. This control unit 400 sends out the sending data SD, which is sent from the link control unit 600, when it receives the mode selected signal MODSEL.

Moreover, the output Q of the aforementioned flip-flop 705 is sent out as the busy-on signal BUSYON through an OR gate 719 to the transmission control unit 400. This signal is applied to a busy control circuit 407 in the transmission control unit 400 thereby to make the busy indicating bit $A_{00}$ of the link packet region A indicate the busy state.

On the other hand, the signal, which is synchronized with the head channel $A_0$ generated from the start timing circuit 701, is sent out as the check reset signal BCCRST to the transmission control unit 400. In response to that signal BCCRST, the content BCCR of the block check register of the transmission control unit 400 is initially set to zero.

On the other hand, in response to a subsequent timing signal, a flip-flop 703 is set so that its output Q is sent out as a check operation signal BCCACT to the transmission control unit 400. Upon reception of that signal BCCACT, the operation of sequentially setting the output of the block check arithmetic operation unit 415 of the transmission control unit 400 in the block check register 416 is effected.

After that, when the tail channel signal TECH indicating the completion of the link packet region A is sent out of the link control unit 600, the completion timing circuit 702 is started. This circuit 702 prepares the timing signal, which is made operative to transmit the later check bit (i.e., the channel $A_{14}$ of FIG. 2G) of the data region, and sends it out as a block check select signal BCCSEL through an AND gate 718 to the transmission control unit 400. Upon reception of that signal BCCSEL, the block check selector 414 carries the content of the block check register 416, which is stored with the result of the arithmetic operation of the check, on the check code channel $A_{14}$ (which should be referred to FIG. 2G) of the link packet region A and sends it out to the common transmission line. In response to the timing signal from the completion timing circuit 702, moreover, the sending flip-flop 705 is reset by the timing signal so that its output Q is not generated. As a result, the sending gate signal SG, the busy-on signal BUSYON and the mode select signal MODSEL are not all generated to complete the sending operation.

Next, the operations when the link packet data sent out of the sending node equipment return to their original node equipment after they have circulated through the transmission loop line will be described in the following.

Like the sending operations, the head channel signal STCH enters the start timing circuit 701 of the packet control unit 700 from the link control unit 600 through the terminal bus thereby to start that start timing circuit 701. On the other hand, an address signal ADDR or the output of the receiving register 403 of the transmission control unit 400 enters a coincidence detection circuit 710 of the packet control unit 700. The coincidence detection circuit 710 detects, at the timing of the head channel of the link packet region A, whether the address signal ADDR and the address signal of the source node, which is generated by an address generator 711, become coincident or not. In the present embodiment, as is apparent from FIG. 2G, since the head channel $A_0$ is assigned for the sending node address, the fact that the address of that channel $A_0$ and the address of the address generator 711 are coincident means that the packet data sent out of the source node unit has circulated through the transmission loop line to return. At this time, therefore, the data received is taken into the node unit, thus processing the sending completion.

First of all, if the aforementioned two addresses become coincident, a sending completion flip-flop 706 is set by the output of an AND gate 714. The output Q of that flip-flop 706 is applied as the busy-off signal BUSY-OFF to the busy control circuit 407 of the transmission control unit 400 through an OR gate 721. The busy control circuit 407 makes the head bit $A_{00}$ of the link packet region A indicate "0" (i.e., the idle state) so that another node unit can use the aforementioned packet region A.

On the other hand, the timing circuit 701 prepares such a timing signal as turns on the completion flip-flop 707 at the timing at which the address information (i.e., the channels of $A_0$ to $A_3$) of the link packet region A are sent out of the transmission control unit 400 to the link control unit 600. The timing signal thus prepared is applied to the set terminal S and the reset terminal R of the flip-flop 707. Moreover, such a timing signal as turns on a status flip-flop 708 at the timing at which the status byte (i.e., the information of the channel $A_{15}$) is sent out of the transmission control unit 400 to the link control unit 600 is prepared by the flip-flop 723, the AND gate 716 and so on and is applied to the set terminal S and the reset terminal R of the flip-flop 708. Moreover, the outputs of the aforementioned flip-flops 707 and 708 are sent out as the tail gate signal TEG and the status gate signal STATG, respectively, to the link control unit 600.

In the link control unit 600, as has been described in the above, the information during the period, for which the aforementioned gate signals TEG and STATG are on, i.e., the information of the channels $A_0$ to $A_3$ and $A_{15}$ is taken into the sending completion FIFO.

Incidentally, as has been described in the above, the preparation of such a timing signal as turns on the flip-flops 707 and 708 for a predetermined time period can be easily realized by using counters or shift registers as the timing circuits 701 and 702.

Next, the operations in case the packet data sent from the sending node equipment is to be received will be described in the following.

In the present embodiment, since the third channel $A_2$ (which should be referred to FIG. 2G) of the link packet region A has the destination node address, the coincidence between the address information of the channel $A_2$ and the address of the source node unit has to be detected in case the data is to be received. For this purpose, the timing circuit 701 first prepares the timing signal, which is synchronized with the aforementioned channel $A_2$, and applies it to an AND gate 717.

On the other hand, the address signal ADDR sent from the transmission control unit 400 and the address of the source node unit are compared by the coincidence detection circuit 710. If those two addresses become coincident at the timing of the aforementioned channel $A_2$, the resultant output is applied through the AND gate 717 to the set terminal of a receiving flip-flop 709. The coincidence of the two addresses at the aforementioned timing means that the sent packet data is the information destined to the source node unit. In order to start the receiving operation, therefore, the packet control unit 700 sends the output Q of the flip-flop 709 as a receiving gate signal RG to the link control unit 600.

The problem raised here resides in that, it is when the destination node address information of the third channel is received that it is determined whether each node unit should receive the packet data or not, and so the source node address of the first channel $A_0$ and the source terminal address of the second channel $A_1$ have to be taken as well in case it is judged that the packet data should be received. Because of that problem, it is necessary to temporarily store the information of the first and second channels $A_0$ and $A_1$. The FIFO memory 409 of the aforementioned transmission control unit 400 is used to delay the packet data by two channels thereby to make it possible to receive the data from the first channel $A_0$. Specifically, if the receiving gate signal RG is fed from the packet control unit 700 to the link control unit 600, the first channel $A_0$ and the sixteenth channel $A_{15}$ are synchronously fed as the packet data PAKD from the transmission control unit 400 to the link control unit 600 until they are taken into the receiving FIFO 613.

On the other hand, the timing circuit 702 prepares the timing signal, which is synchronized with the channel $A_{15}$ of the status byte of the link packet region A, and applies it to an AND gate 722. After the receiving flip-flop 709 has been turned on, the AND gate 722 is opened at the timing of the aforementioned channel $A_{15}$ so that the output is sent out as the status select signal STATSEL to the transmission control unit 400. In this control unit 400, if the status select signal STATSEL is received, the status information STATB indicating the receiving situation is carried on the aforementioned channel $A_{15}$ so that the packet data is sent out to the receiving register 404. The aforementioned status signal STATB is prepared, as is understood from FIG. 10, by delaying the logic product output of another status signal STATA and the tail channel signal TECH for a predetermined time period by the action of a delay circuit 704. On the other hand, the status signal STATA indicates the situation concerning whether the receiving FIFO 613 has overflowed or not in case a logic product is to be taken with the channel signal TECH, as will be seen from FIG. 9.

The description thus far made is directed to the timing control in the case of sending and receiving the data of the link packet region A. Absolutely the same description is applied to the case in which the data of the packet switching region is to be sent and received, and the repeated explanation will be omitted here.

Packet Interface Unit 800

The packet interface unit 800 forms the interface between the packetizing unit 1000 and another equipment and controls the sending and receiving operations of the data at the packet switching region D (which should be referred to FIGS. 2C and 2D). The construction and operation of that interface unit 800 are substantially the same as those of the link control unit 600 (which should be referred to FIG. 9), and the following description is restricted to different portions.

Figure 11:
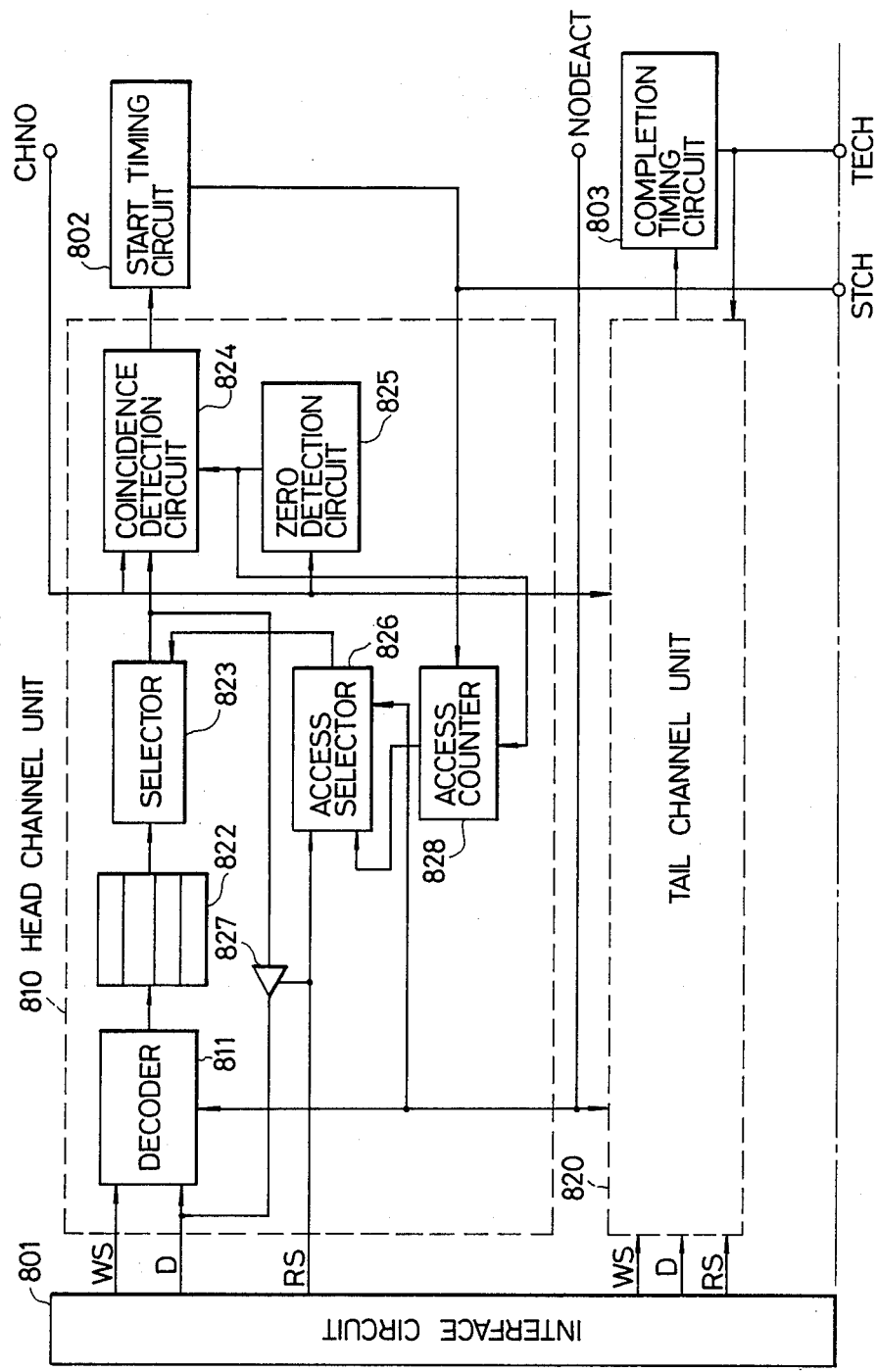
FIG. 11 is a constructional view shwoing another embodiment of the packet control unit of the system of the present invention.

FIG. 11 shows the frame construction control portion of the packet interface unit 800, and the remaining portion is similar to that of FIG. 9.

In the case of the present embodiment, the four packet switching regions D can be set at the maximum in the frame, as is apparent from FIG. 2C. It is, therefore, necessary to prepare four head channel registers and tail channel registers, respectively. Therefore, a four-word register file memory 822 is used here. The construction of a head channel portion 810 and a tail channel portion 820 are the same, and the head channel register portion 810 will be described as representative.

The respective head channel numbers of the four packet switching regions are initially set in a sequential manner from the earlier numbers in the register file memory 822. This setting operation can be realized by sending out of the processing unit both the write select signal WS for designating the address of the memory 822 and the data D indicating each head channel number. The signal from the processing unit 300 is fed through an interface circuit 801 to a decoder 811, in which it is decoded. After that, the decoded signal is set in the register file memory 822. If the region is not divided up to the maximum division number 4, the contents of the remaining registers are left at a value "0".

The aforementioned decoder 811 is receives a node activation signal NODEACT, which is sent out of the channel control unit 200, so that the channel register number can be read out and written in only without that signal. This node activation signal NODEACT is used, as has been described hereinbefore, to operate the node unit or to stop the operation.

When the content of the aforementioned register file memory 822 is to be read out, the read select signal RS is sent out of the processing unit 300 and applied to an access selector 826. This access selector 826 applies the read select signal RS to a selector 823 only when the node activation signal NODEACT is off. The data read out of the memory 822 are fed to the processing unit 300 by way of the selector 823 and a buffer gate 827.

After the initial setting operation has been completed, the node activation signal NODEACT is turned on, and the control of the packet data sending and receiving operations is started.

First of all, the signal CHNO sent from the channel control unit 200 and indicating the channel number is applied to a zero detection circuit 825. This zero detection circuit 825 prohibits the output of a coincidence detection circuit 824 if it detects that the channel number is zero. As has also been described hereinbefore, this is intended to prevent the coincidence detection circuit 824 from generating its output at the timing of the channel number 0 of the synchronization region because the content of the register file memory 822 takes a value of "0" when no packet region is designated.

On the other hand, the output of the zero detection circuit 825 is fed to the reset terminal of an access counter 828 thereby to reset the content of the counter 828. In other words, this access counter 828 is held in the state of 0 during the period of the synchronous region X. The content of that access counter 828 is applied to the access selector 826. This access selector 826 sends out the signal ("0"), which is received from the address counter 828, as it is because it is fed with the node activation signal NODEACT in the ON state. The output of that access selector 826 is applied to the selector 823 so that it becomes the selection signal of the register file memory 822. As a result, the 0th word of the register file memory 822 is read out and applied to one input of the coincidence detection circuit 824. The other input is fed with the channel number signal CHNO. If both the input signals become coincident, a start timing circuit 802 is started by the output of the coincidence detection circuit 824. The subsequent operations are the same as those of the link control unit 600.

The value of the access counter 828 is counted up to "1" by the output of the timing circuit 802. As a result, the first word of the register file memory 822 is then read out to prepare for the detection of the head channel of the second packet switching region.

The description thus far made is directed to the detection of the head channel. Absolutely the same description applies to the tail channel, and this detail will be omitted here.

Frame Generation Control Unit 900

One embodiment of the construction of the frame generation control unit 900 will be described in the following with reference to FIG. 12.

This frame generation control unit 900 is provided in one (which will be referred to a "frame control node unit) of the node units linked to the loop type common transmission line and is connected between the sending-/receiving unit 400A and the transmission unit 400B of the transmission control unit 400 of FIG. 7.

A sending clock generator 901 provides an original oscillator of the transmission clocks of the data communication system of the present invention, and only the frame control node unit uses the output of the aforementioned sending clock generator 901 as the sending clock of the sending/receiving unit.

The output pulses of the aforementioned sending clock generator 901 are first applied to a decimal clock counter 902. The use of this decimal clock counter is made necessary because one channel is composed of ten bits in the embodiments of the present invention. The output of that clock counter 902 is further applied to a clock decoder 903, in which there are generated both the clock signals $CLK_0I$ and $CLK_0II$ to be used in the frame control node unit and the timing signal for accessing later-described synchronization circuit 906 and a frame memory 912. Those clock signals $CLK_0I$ and $CLK_0II$ are similar to the clock signals CLKI and CLKII of the usual node unit as take a value of "1" between the 0th bit to the first bit and between the fifth bit to the sixth bit of the ten bits of one channel, for example, but take a value of "0" for the remaining bits.

On the other hand, both the clock signals CLKI and CLKII, which are generated by the frame synchronization unit 100 on the basis of the timing signal generated by the receiver 401 of the transmission control unit 400, and the signal RR, which is to be sent from the receiving register 403, are synchronized with the receiving clocks but not the output of the aforementioned sending clock generator 901. As a result, the present frame generation control unit takes thereinto the clock signals CLKI and CLKII, the signal RR and so on thereby to make them in phase with the sending clocks $CLK_0I$ and $CLK_0II$.

For this phase registration, the clock signals CLKI and CLKII from the frame synchronization unit 100 and the signal from the clock decoder 903 are first applied to the synchronization circuit 906. In this circuit 906, there is prepared a signal which is to be generated at a suitable timing avoiding both the timings before and after the rises of the receiving clocks CLKI and CLKII and the timings before and after the rise of the sending clock $CLK_0I$.

On the other hand, the receiving clock CLKII and the channel activation signal CHACT are applied to an AND gate 930, the output of which is further applied to a receiving channel counter 908. As a result, when a predetermined number of channels are counted by the receiving channel counter 908, they are decoded by a decoder 907 thereby to generate the end channel signal ENDCH.

The counted value of the receiving channel counter 908 and the content RR of the receiving register 403 are set in synchronous buffer registers 909 and 917, respectively, at the timing of the output of the synchronization circuit 906.

Furthermore, the contents stored in the buffer registers 909 and 917 are set in receiving registers 910 and 918, respectively, at the timing of the sending clock $CLK_0I$.

The aforementioned clock decoder 903 prepares the signal, which is on from the break of the sending clock $CLK_0I$ to the break of the clock $CLK_0II$, i.e., the signal which is on for one half time period of one channel. The signal thus prepared is applied to an address selector 911 and a write gate 914. As a result, the address selector 911 selects the output of the receiving register 910 from the two inputs and applies it to the address input terminal 912 of the frame memory. Simultaneously with this, the write gate 914 is opened to apply the output of the receiving register 918 to the input data terminal of the frame memory 912. As a result, the frame memory 912 has written therein the content of the receiving register 918 at the address indicated by the receiving channel register 918.

The aforementioned frame memory 912 has its one word composed of ten bits and has such a capacity as to store information composed of words equal to the total number of channels of one frame. In other words, the frame memory 912 has such a capacity as to store all the information of one frame.

For the other one half period of one channel, i.e., from the break of the sending clock $CLK_0II$ to the break of the clock $CLK_0I$, the aforementioned address selector 911 selects the output of a channel counter 904 from the two inputs and applies it to the address input terminal of the frame memory 912. The aforementioned channel counter 904 receives the sending clock $CLK_0II$ and counts the number of channels to be sent. From that frame memory 912, the information of the address indicated by the value of the channel counter 909 is read out until it is set in a sending register 913 at the rising timing of the sending clock $CLK_0I$.

When the counted value of the channel counter 904 reaches a predetermined value (i.e., the tail channel number), it is reset by the output of a decoder 905.

On the other hand, the information read out to the aforementioned sending register 913 is applied together with the output of a synchronous pattern generator 915 to a sending selector 916. This sending selector 916 sends out the output of the synchronous pattern generator 915, when the channel counter 904 indicates the synchronous region (i.e., 0th to third channels in the present embodiment), but the content of the sending register 913 when the channel counter 904 indicates another region. The output RR of that sending selector 916 is sent out to the transmission unit of the transmission control unit 400. More specifically, the information RR received by the receiving register 403 is set out to the transmission unit after its has been made to be in phase with the timing of the sending clock by the operations thus far described.

The frame generation control unit 900 has a function to monitor a malfunction in addition to the function to effect the aforementioned phase registration. Specifically, this function is to judge that a malfunction takes place in the system, in case the state in which all the busy indicating bits of all the channels indicate the busy state is continued for a period longer than a predetermined value, thereby to force the busy indicating bit to indicate the idle state.

Figure 12:
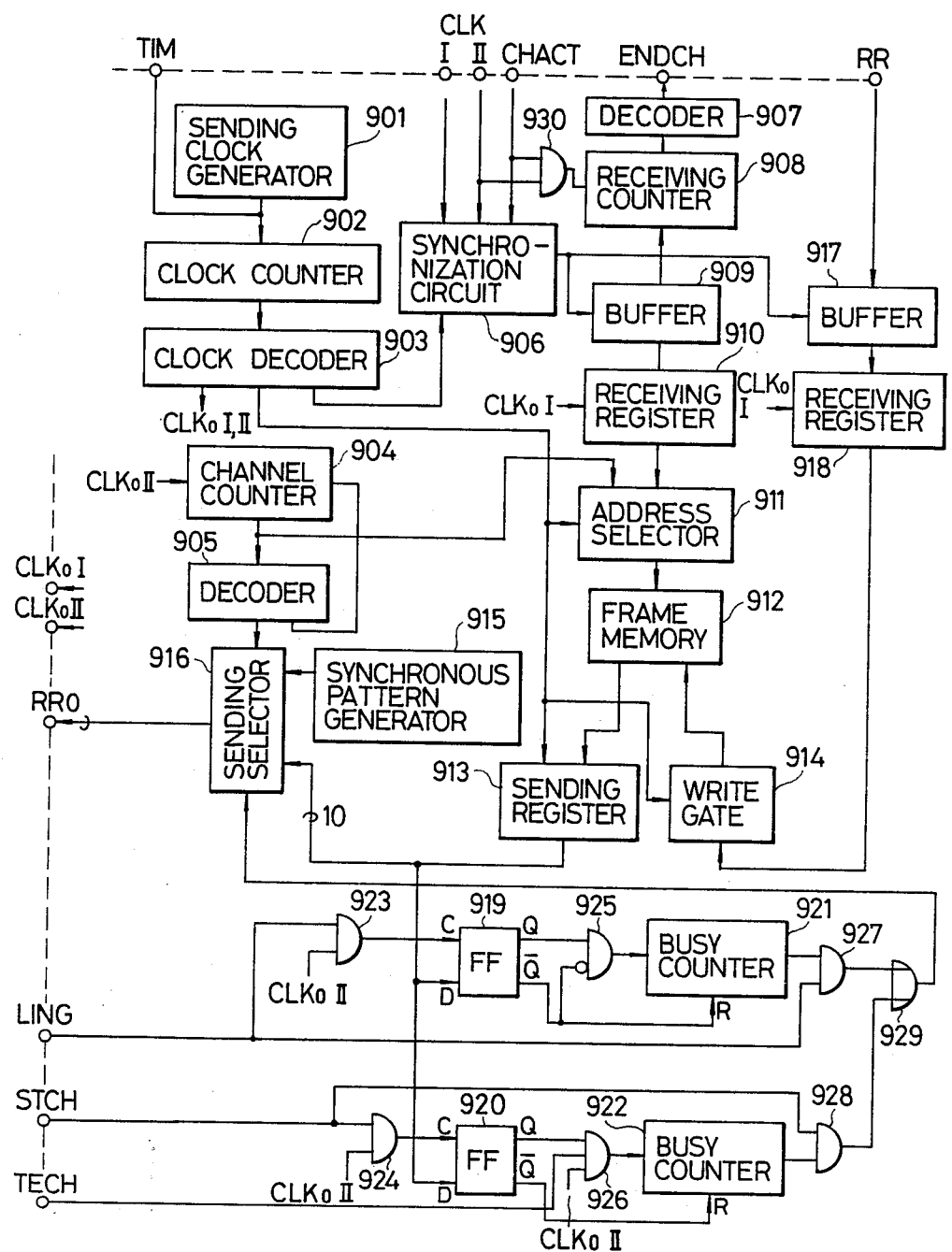
FIG. 12 is a constructional view showing one embodiment of a frame generation control unit of the system of the present invention.

This function is realized by the components 919 of the circuit shown in FIG. 12.

The following description will be made such that the aforementioned malfunction monitoring function is divided for the malfunction detection in the line switching region and for the malfunction detection in the packet switching region.

The timing detection of the line switching region B (which should be referred to FIG. 2B) is conducted at the channel control unit 200 thereby to send the line gate signal LING which is on during the time period of the line switching region B. This line gate signal enters the AND gate 923 together with the clock signal CLKII so that the resultant output is applied to the C terminal of the delay type flip-flop 919. On the other hand, the busy bit of the information for one channel, which is read out by the sending register 913, i.e., the information of the head bit is applied to the D terminal of that flip-flop 919. As a result, if the busy bit is on, the flip-flop 919 is set, and its output Q is applied to the AND gate 925. When the line gate signal LING is turned off, that output Q enters the busy counter 921 through the gate 925. Thus, if the state in which the head bits of all the channels of one frame are on is continued for several frames, the content of that busy counter 921 is counted up for the number of the frames. If there is one or more idle indicating channels in one frame, the flip-flop 919 is turned off so that its output $\overline{Q}$ resets the busy counter 921. This busy counter 921 generates its output when its counted value exceeds a predetermined value, i.e., in case the state having all channels held busy is continued for a predetermined number of frames. The resultant output signal is applied together with the line gate signal LING to the AND gate 927, the output of which enters the sending selector through the OR gate 929. As a result, only in case the state having all channels held busy is continued for a predetermined number of frames, the busy bit in the line switching region of the information, which is sent out by the sending selector 916, can be forcibly turned off.

Next, the malfunction detection of the packet switching region will be described in the following.

The head channel signal STCH of the packet switching region is applied together with the clock signal CLKII to the AND gate 924, the output of which is applied to the C terminal of the delay type flip-flop 920. The D terminal of this flip-flop 920 is fed with the information of the head bit of each channel, as is similar to the aforementioned operation. The flip-flop 920 is set to have an output of "1" if the busy bit is on at the timing of the head channel signal STCH. In case the output Q is "1", the AND gate 926 generates, at the timing of the tail channel signal TECH, an output, which is applied to the busy counter 922. If there are one or more idle indicating channels in the channels of one frame, the flip-flop 920 is reset so that its output $\overline{Q}$ resets the value of the busy counter 922. If the state having all the channels held busy is continued for several frames so that the counted value of the counter 922 exceeds a predetermined value, the busy-off signal is sent from the AND gate 928 at the timing of the head channel to the sending selector 916. As a result, the busy bit of the packet switching region, which is sent out of the sending selector 916, is forcibly turned off.

According to the system of the present invention thus far described, there can be prominent effects that data at an arbitrary speed can be transmitted for the data speed from 50 bps to 48 Kbps and that the node units having an identical construction can be used without resorting to units having complex constructions, e.g., muliplexing equipments.

The embodiments thus far described are directed to the case (which will be simply referred to as a "ten-bit system") in which one channel is composed of the total ten bits = eight bits of data + data validity indicating bit + channel busy indicating bit.

One channel may be sufficient if it is composed of eight channels in case only the following terminals are linked:

(1) Voice (or telephone) information seven-bit PCM + channel busy indicating bit:
(2) Data six bits + data validity indicating bit + channel busy indicating bit; and
(3) The packet has only one bit of the head channel.

All of these are used to indicate the busy state of the packet as a whole, and the data unit of that channel has seven bits. All the eight bits can be used as data after the second channel.

Figure 13:
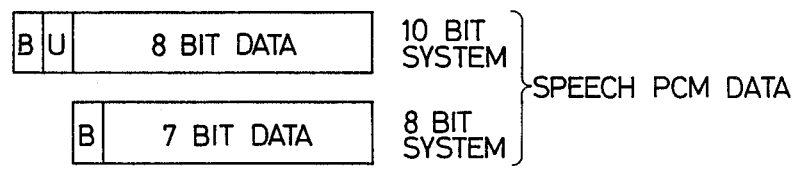
In FIGS. 13 to 15 showing the case in which a function to switch a 10-bit system and an 8-bit system is added to the system of the present invention.
Figure 13:
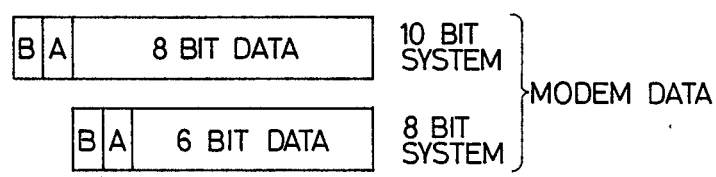
Figure 13:
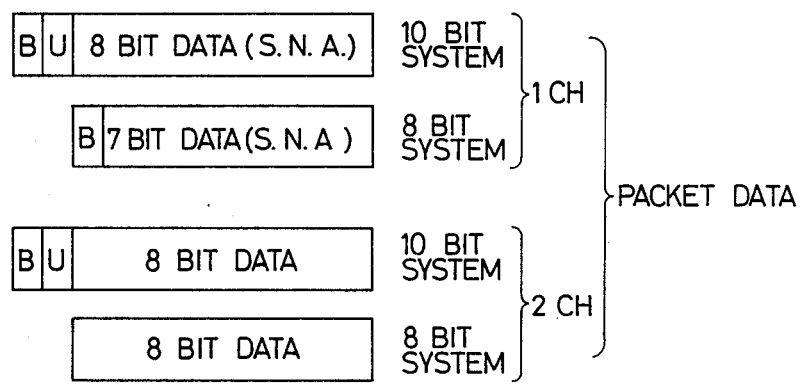

The method for constructing one channel of eight bits by the methods (1) to (3) will be shortly referred to as an "eight-bit system". FIG. 13 shows the assignments of bits of one channel according to the ten-bit system and the eight-bit system. In the Figure: letter B indicates the channel busy indicating bit; letter A indicates the data validity indicating bit; and letter U indicates the bit which is not used.

The method thus far described in the present embodiment can be applied without any essential change even if the eight-bit system is adopted.

Interchange means for realizing the present embodiment with the use of a kind of hardware by interchangeably using the ten-bit system and the eight-bit system will be described in the following.

Whether the ten-bit system or the eight-bit system is to be adopted is determined by what terminal is linked to the network system shown in FIG. 1. Either of the systems is determined in accordance with the signal from the switch or the processing unit 300 when beginning use of the system.

The frame synchronization unit of FIG. 4 is changed in the following manner so as to realize the aforementioned interchange between the ten-bit system and the eight-bit system.

The synchronous pattern generator 101, the coincidence detection circuit 102, the synchronization counter 106, the decoder 107, the clock counter 114 and the decoder 115 are changed from those for the existing ten-bit system and are renewed to those for the eight-bit system, and they are interchanged in response to the eight-bit/ten-bit interchanging signal (which will be simply referred to as a "signal OCTET"). This signal OCTET is generated by the switch or the processing unit 300 when the system turns on. The output clock CLKII of the decoder 115 is such a signal for the case of the eight-bit system as takes a value of 1 when the value of the clock counter 114 is 4.5.

Alternatively, by adopting a system which can be commonly used for the eight-bit system and the ten-bit system, the synchronization counter 106 and the clock counter 114, for example, may be made singular so that either operation for the eight-bit/ten-bit system can be effected in response to the "ON" and "OFF" of the signal OCTET.

Moreover, the whole circuit shown in FIG. 4 may be separately provided for the eight-bit system.

Figure 14:
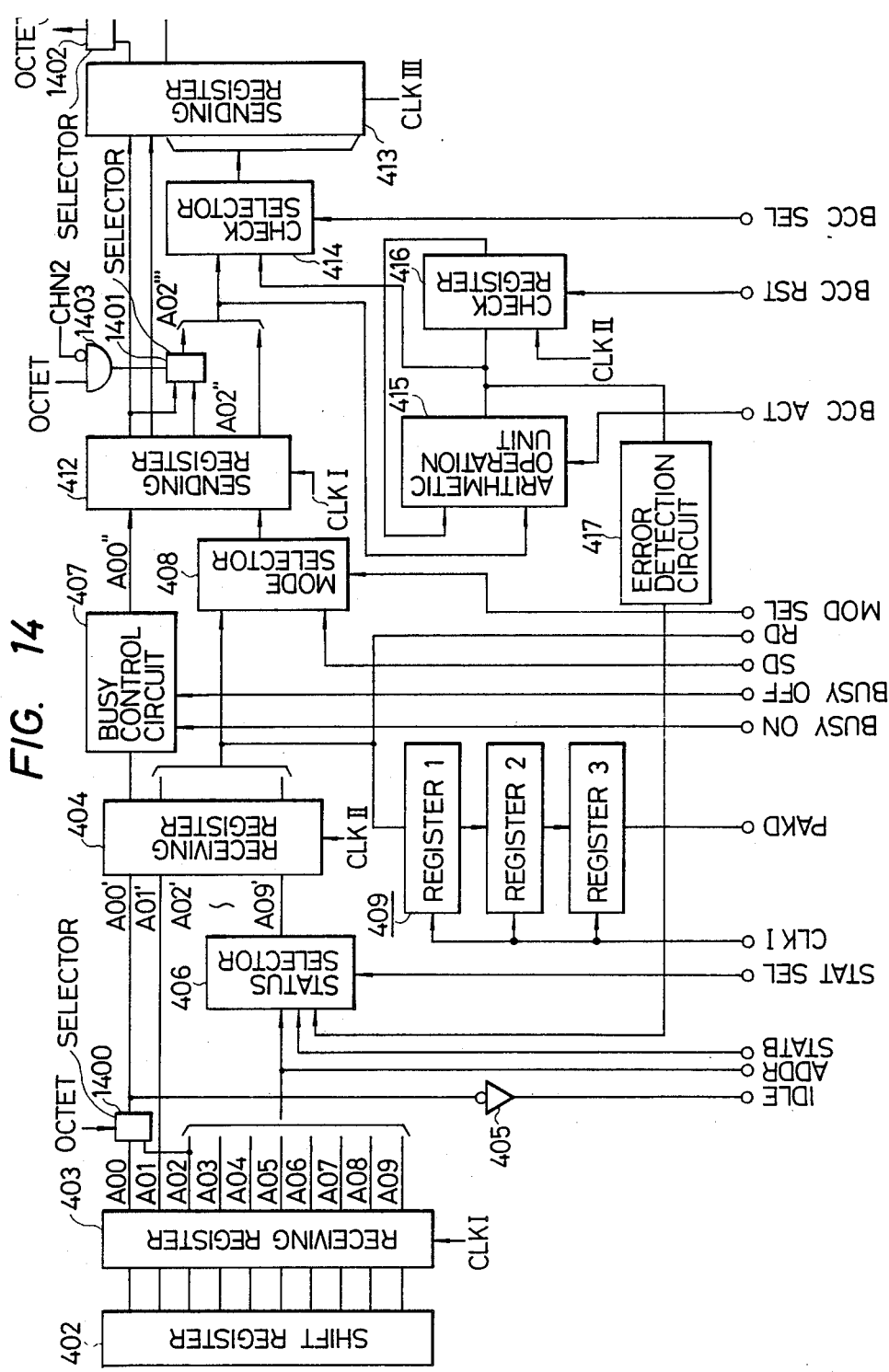

FIG. 14 shows one embodiment of the transmission control unit to which the eight-bit/ten-bit interchanging function is added.

The operations in the case of the eight-bit system will be described in the following.

Of the eight-bit data which is taken into the receiving register 403 from the shift register 402 at the timing of the clock signal CLKI, the busy indicating bit A02 is introduced together with the busy indicating bit A00 for the ten-bit system into a selector 1400. In case the signal OCTET is on, the bit A02 is generated as a bit A00'. In other words, the busy indicating bit of the channel appears as the bit A00' for either the eight-bit system or the ten-bit system.

Signal to Busy Control Circuit 407

The busy indicating bit A00", which is either set or reset by the signal BUSYON or BUSYOFF or left unchanged, is introduced into the sending register 412 at the timing of the clock signal CLKI and is then introduced together with a busy indicating bit A02" for the eight-bit system into a selector 1401. This selector 1401 sends the bit A00" as A02''' when the signal OCTET is on and when it is not subsequent to the second channel of the packet. As a signal for indicating that it is not subsequent to the second channel of the packet, there is used a signal which is prepared by inverting signal CHN$_2$ which indicates the second channel and is obtained from the timing circuit 701. When the signal OCTET is off, i.e., subsequent to the second channel of the packet for the ten-bit and eight-bit systems, the bit A02" is sent as it is as A02'''. The reason why the bit A02" is allowed to pass as it is subsequent to the second channel of the packet for the eight-bit system is intended to ensure the eight-bits of data after the second channel.

After all, by adding and using the two selectors 1400 and 1401 for the eight-bit system, the processings such as the busy control or the processing of the sending and receiving of data at the transmission control unit may be the same independently of the difference between the eight-bit/ten-bit systems.

The eight-bit signal carrying the busy information bit A02''' is introduced through the check selector 414 into the sending shift register 143 at the timing of the clock signal CLKIII. In the case of the eight-bit system, the series output is derived from the eighth-bit terminal midway of the ten-bit shift register 413 which is prepared for the ten-bit system. In a selector 1402, the eigth-bit output of the sending shift register 413 is selected and used as the output of the selector 1402 until it is sent to the sender 418 of FIG. 7, when the signal OCTET is on. When this signal OCTET is off, on the contrary, the output of the tenth bit is selected and sent likewise to the sender 418.

Figure 15:
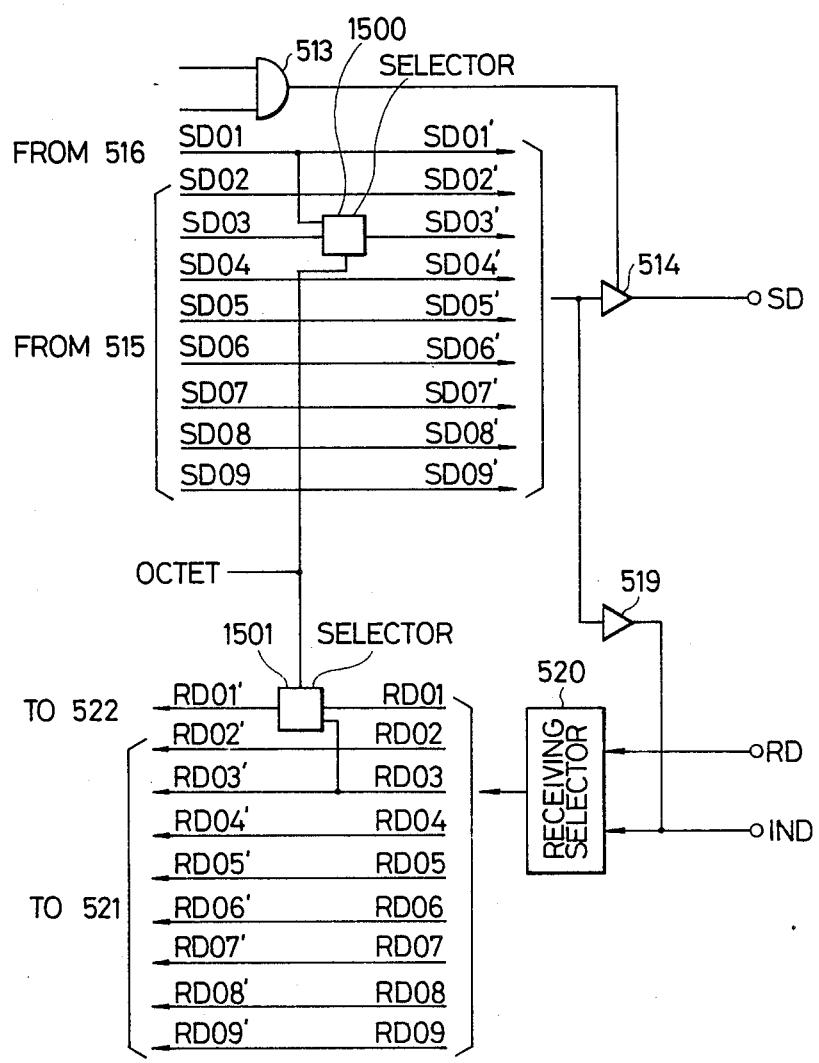

FIG. 15 shows an example of the construction of a portion of the terminal control unit which has a function to interchange the eigth-bit and ten-bit systems, especially, a portion which is to be added to FIG. 8A.

First of all, in case the data is to be sent from the terminal, a selector 1500 has a function to send an output signal SD01 from the flip-flop 516, which is set by the signal SREQ of FIG. 8A, as a data validity indicating bit SD03' for the eight-bit system when the signal OCTET is on. By the action of that selector 1500, the terminal sends the data validity indicating signal at the bit position according to the system used, if the data validity indicating signal is generated as the signal SREQ no matter which the system might be of eight-bit or ten-bit type.

Next, in case the terminal receives the data, a data validity indicating bit RD03 for the eight-bit system of the signl RD or IND, which is selected by the receiving selector 520, is sent as a bit RD01' by a selector 1501. As a result, the validity of the data can be found out if the terminal detects the bit RD01' irrespective of either the eight-bit/ten-bit system.

Afterall, by using the selectors 1500 and 1501, the terminal can send and receive the data validity indicating signal at the identical bit position no matter whether the system may be of the eight-bit or ten-bit type.

We claim:

1. A data communication system comprising a plurality of node equipments and at least one transmission loop line coupling said node equipments, at least one of said node equipments including means for generating a frame having a multiplicity of channels, at least one channel in each frame containing a region for data information and a region for indicating the validity of said data information such that a predetermined value is set in said region for indicating the validity of data information to be transmitted and data information to be transmitted is set in said region for data information if said data information is to be transmitted through a channel already occupied as a communication path from one node equipment to a designated node equipment and means for transmitting a generated frame to said transmission loop line.

2. A data communication system according to claim 1, wherein said frame includes a line switching region and at least one channel in said line switching region contains a region for data information and a region for indicating the validity of said data information.

3. A data communication system according to claim 1, wherein at least one channel in said frame act as a line switching region, and a sequence of channels in the same frame act as a packet switching region.

4. A data communication system according to claim 3, wherein at least two channels in each frame are assigned for communication between desired two node equipments.

5. A data communication system according to claim 1, wherein said frame includes packet switching region and at least one channel in said packet switching region contains a region for indicating the busy state of said channel.

6. A data communication system according to claim 1, wherein said frame further includes a region for controlling the link between said node equipments, and the information for controlling said line is contained in a packet switching region.

7. A data communication system according to claim 1, wherein at least one of said node equipments includes means for receiving a transmitted frame from said transmitting loop line, means for determining whether the value of the validity indicating region is a specific value and means for processing said data information when the value of the validity indicating region is the specific value.

8. A data communication system according to claim 7, wherein said frame includes a line switching region and at least one channel in said line switching region contains a region for data information and a region for indicating the validity of said data information.

9. A data communication system according to claim 7, wherein at least one channel in said frame act as a line switching region, and a sequence of channels in the same frame act as a packet switching region.

10. A data communication system according to claim 9, wherein at least two channels in each frame are assigned for communication between desired two node equipments.

11. A data communication system according to claim 7, wherein said frame includes packet switching region and at least one channel in said packet switching region contains a region for indicating the busy state of said channel.

12. A data communication system according to claim 7, wherein said frame further includes a region for controlling the link between said node equipments, and the information for controlling said line is contained in a packet switching region.

* * * * *